US010549655B2

(12) United States Patent
Sasaki et al.

(10) Patent No.: US 10,549,655 B2
(45) Date of Patent: Feb. 4, 2020

(54) SEAT SLIDE MECHANISM

(71) Applicants: NHK SPRING CO., LTD., Yokohama-shi, Kanagawa (JP); IMASEN ELECTRIC INDUSTRIAL CO., LTD., Aichi (JP)

(72) Inventors: Yoshitaka Sasaki, Yokohama (JP); Akihiro Hayashi, Yokohama (JP); Hiroaki Takeuchi, Yokohama (JP); Donghyoun Kim, Yokohama (JP); Shunichirou Osa, Yokohama (JP); Yuji Masuda, Aichi (JP)

(73) Assignees: NHK Spring Co., Ltd., Yokohama-shi, Kanagawa (JP); Imasen Electric Industrial Co., Ltd., Inuyama-shi, Aichi (JP)

( * ) Notice: Subject to any disclaimer, the term of this patent is extended or adjusted under 35 U.S.C. 154(b) by 0 days.

(21) Appl. No.: 16/163,858

(22) Filed: Oct. 18, 2018

(65) Prior Publication Data

US 2019/0126785 A1    May 2, 2019

(30) Foreign Application Priority Data

Oct. 31, 2017   (JP) .................................. 2017-211136

(51) Int. Cl.
*B60N 2/07*   (2006.01)
*B60N 2/22*   (2006.01)
*B60N 2/08*   (2006.01)

(52) U.S. Cl.
CPC ......... *B60N 2/0722* (2013.01); *B60N 2/0715* (2013.01); *B60N 2/085* (2013.01); *B60N 2/0818* (2013.01); *B60N 2/0881* (2013.01); *B60N 2/22* (2013.01)

(58) Field of Classification Search
CPC .. B60N 2/0772; B60N 2/0715; B60N 2/0818; B60N 2/085; B60N 2/0881; B60N 2/22
See application file for complete search history.

(56) References Cited

U.S. PATENT DOCUMENTS 5,855,413 A * 1/1999 Couasnon ............... B60N 2/123
                                                      297/341
6,715,833 B2 * 4/2004 Ito ........................... B60N 2/12
                                                      248/429

FOREIGN PATENT DOCUMENTS

JP    2006-142923 A    6/2006
JP    2016-159734 A    9/2016

* cited by examiner

*Primary Examiner* — Anita M King
(74) *Attorney, Agent, or Firm* — Knobbe, Martens, Olson & Bear, LLP

(57) ABSTRACT

Forward tilting of a seat back and pushing of the seat forward allow fixation between an upper slide and an upper slide rail to be released, thereby allowing the upper slide to reach a tip end position of the upper slide rail. With this structure, a lower lock mechanism releases fixation of a lower slide to a lower slide rail and a vertical slide lock mechanism fixes the upper slide and the lower slide. Further, pushing the seat back toward a seat front side allows the lower slide integrally provided with the upper slide to move to a tip end position of the lower slide rail.

7 Claims, 37 Drawing Sheets

FIG.11
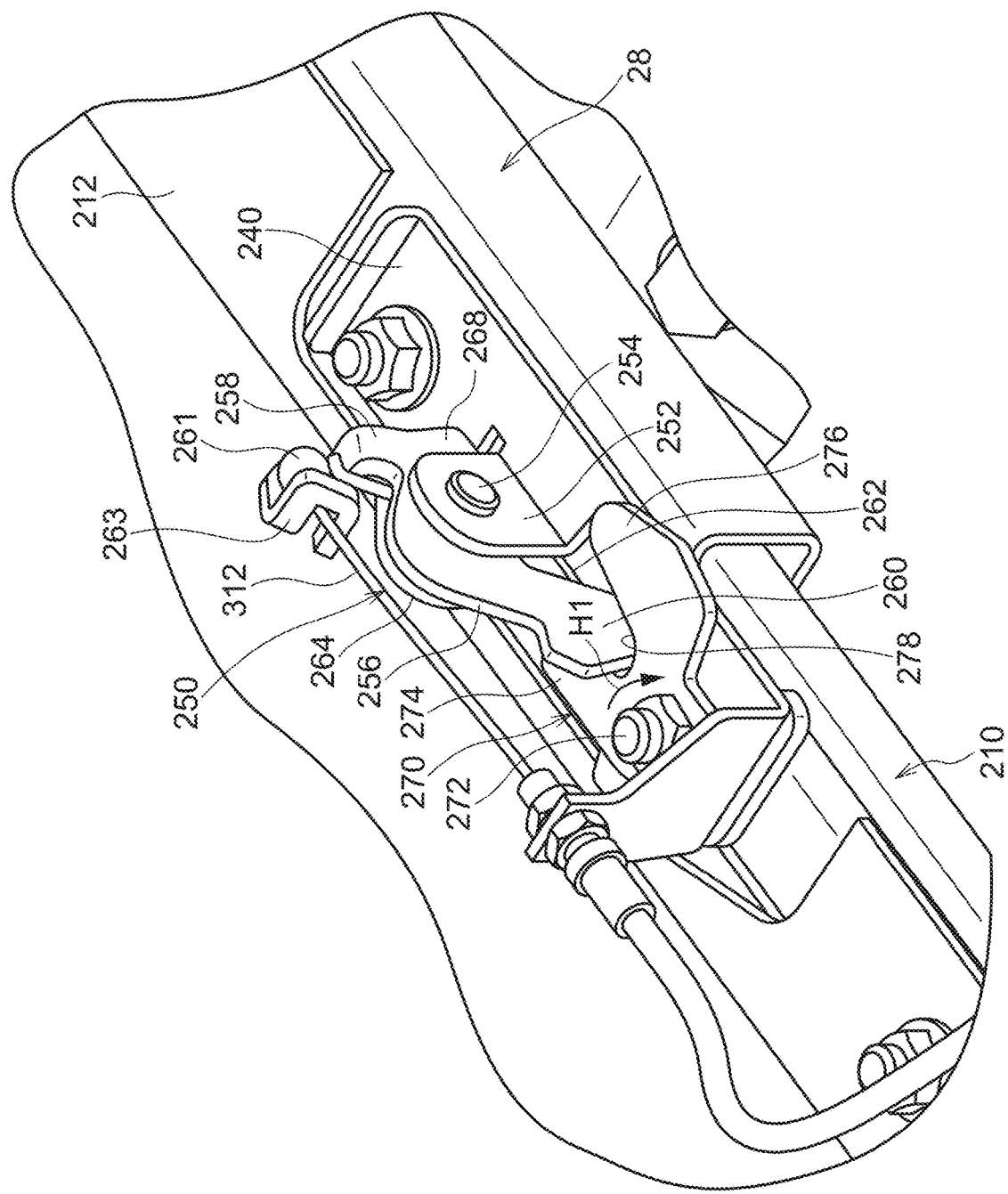
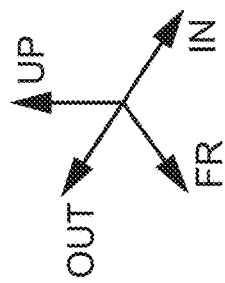

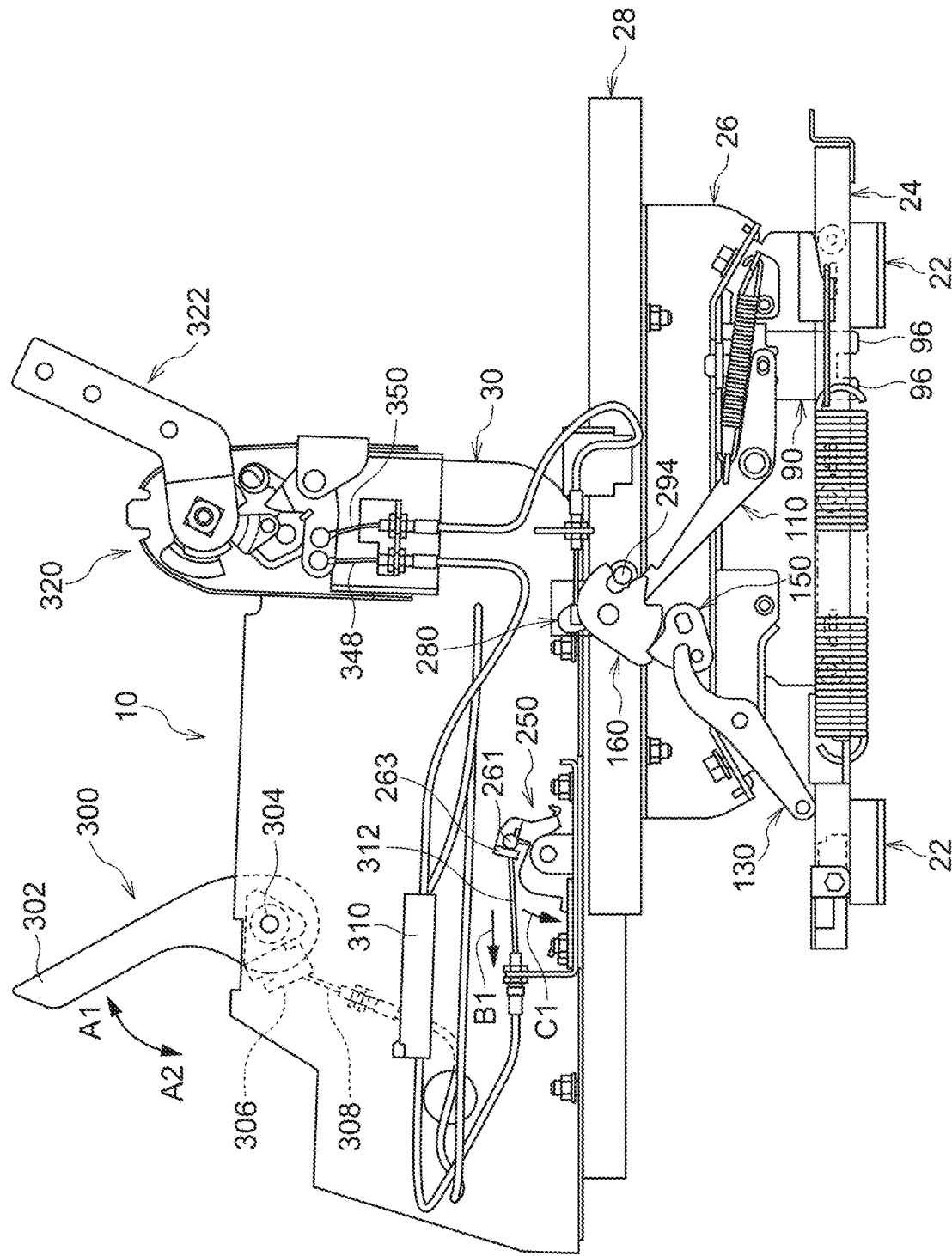

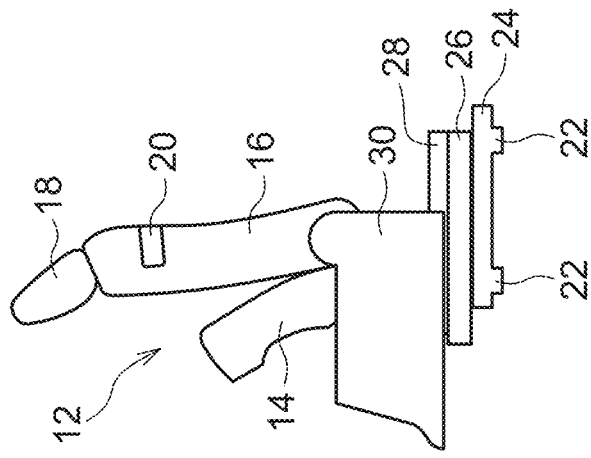
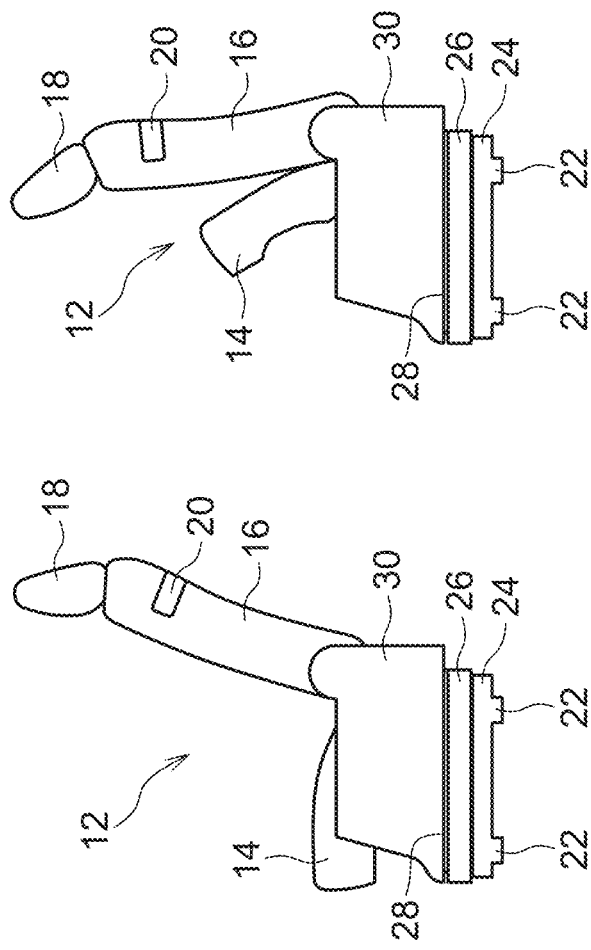

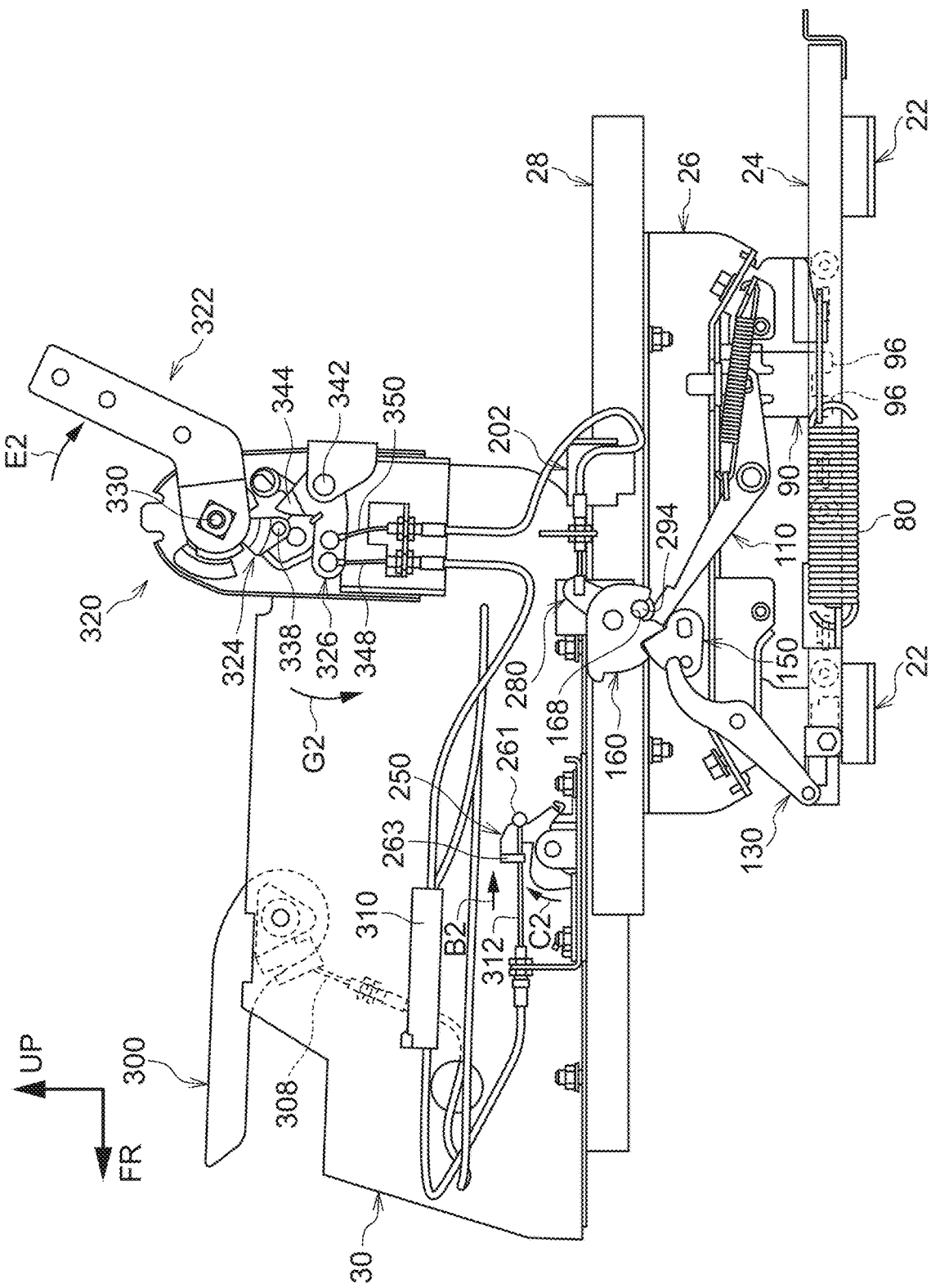

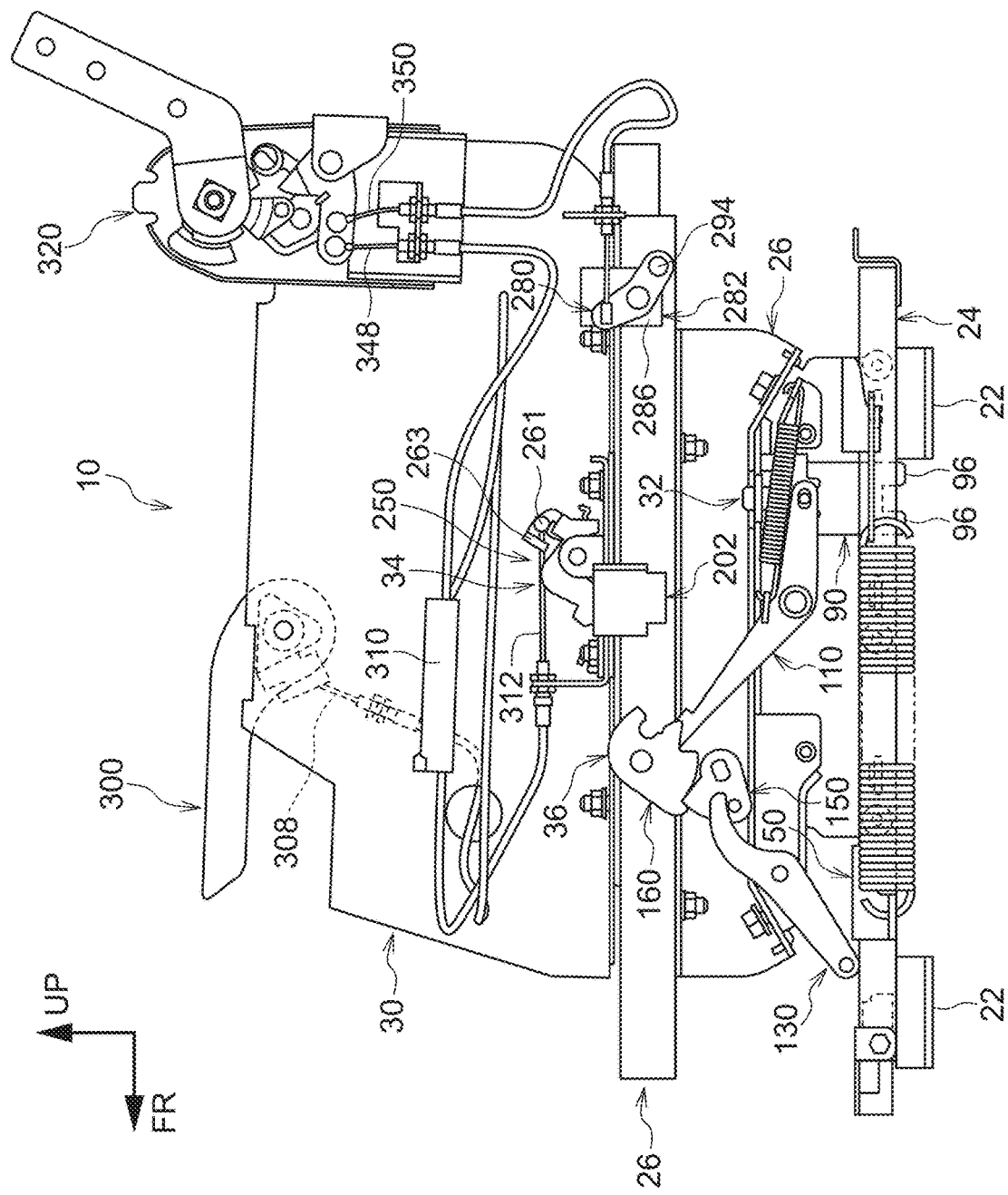

SEAT SLIDE MECHANISM

CROSS-REFERENCE TO RELATED APPLICATION

This application is based on and claims priority under 35 USC 119 from Japanese Patent Application No. 2017-211136 filed on Oct. 31, 2017, the disclosure of which is incorporated by reference herein.

BACKGROUND

Technical Field

The present disclosure relates to a seat slide mechanism.

Related Art

In an automobile, a seat slide mechanism (hereinafter referred to as "walk-in") for moving a front seat of a vehicle seat forward is provided for allowing an occupant seated in a rear-row seat to get on or off.

In such a seat slide mechanism, the larger the amount of movement of the vehicle seat is, the better the occupant seated in the rear-row seat can get on or off. However, when a seat rail is extended, the tip end of the seat rail is located at the feet of the occupant seated in the front-row seat, so that there is a disadvantage that the habitability of the occupant seated in the front-row seat deteriorates and the appearance also deteriorates.

A two-stage slide rail is considered as a means for securing excellent getting-on/off properties (a sufficient sliding amount of a vehicle seat) of an occupant seated in a rear-row seat, while eliminating such inconvenience. For example, Japanese Patent Application Laid-Open (JP-A) No. 2006-142923 discloses a structure in which an intermediate rail movable relative to an upper rail and a lower rail is provided between the upper rail and the lower rail, and unlocking of the upper rail and the intermediate rail and unlocking of the lower rail and the intermediate rail are performed by an occupant operating an operation lever, thereby causing a vehicle seat to move forward and backward.

For example, when the vehicle seat is moved forward, firstly, the occupant pushes the vehicle seat forward in a state where the occupant operates the operation lever to unlock the lower rail and the intermediate rail, and then the occupant moves the intermediate rail to a tip end position of the lower rail to lock the lower rail and the intermediate rail. Subsequently, the occupant operates the operation lever to unlock the upper rail and the intermediate rail and pushes the vehicle seat forward, thereby moving the upper rail to a tip end position of the intermediate rail to lock the upper rail and the intermediate rail. As a result, the movement of the vehicle seat is completed.

SUMMARY

In the case of the structure disclosed in JP-A No. 2006-142923, the operation lever needs to be operated twice in order to move the vehicle seat forward, so that there is a disadvantage that the operation is troublesome. The same is true when the vehicle seat is moved backward.

The disclosure provides a seat slide mechanism that is excellent in operability of a vehicle seat at the time of walk-in and ensures excellent getting-on/off properties of an occupant seated in a rear-row seat.

A seat slide mechanism according to a first aspect includes a lower slide rail fixed onto a vehicle floor, a lower slide disposed in a seat front-back direction so as to be slidable on the lower slide rail, an upper slide rail provided on the lower slide, an upper slide integrally provided with a vehicle seat and disposed in the seat front-back direction so as to be slidable on the upper slide rail, an upper lock mechanism configured to fix the upper slide and the upper slide rail and release the fixation, forward tilting of a seat back of the vehicle seat allowing the fixation between the upper slide and the upper slide rail to be released, and backward tilting of the seat back and movement of the upper slide to a rear end position of the upper slide rail allowing the upper slide and the upper slide rail to be fixed, a lower lock mechanism configured to fix the lower slide and the lower slide rail and release the fixation, forward tilting of the seat back and movement of the upper slide to a tip end position of the upper slide rail allowing the fixation between the lower slide and the lower slide rail to be released, and backward tilting of the seat back and movement of the lower slide to a rear end position of the lower slide rail allowing the lower slide to be fixed to the lower slide rail, and a vertical slide lock mechanism configured to fix the upper slide and the lower slide and release the fixation, forward tilting of the seat back and movement of the upper slide to the tip end position of the upper slide rail allowing the upper slide and the lower slide to be fixed, and backward tilting of the seat back and movement of the lower slide to the rear end position of the lower slide rail allowing the fixation between the upper slide and the lower slide to be released.

In this seat slide mechanism, forward tilting of the seat back allows the fixation of the upper slide and the upper slide rail to be released. Therefore, pushing the seat back forward allows the upper slide to move forward on the upper slide rail. When the upper slide reaches a tip end position of the upper slide rail, the lower lock mechanism releases the fixation of the lower slide to the lower slide rail, and the vertical slide lock mechanism fixes the upper slide and the lower slide.

Further, pushing the seat back forward allows the lower slide integrally provided with the upper slide to move to the tip end position of the lower slide rail on the lower slide rail.

As a result, the vehicle seat that moves with the upper slide moves toward a front side of the seat by an amount corresponding to the length of the upper slide rail and the lower slide rail. That is, the vehicle seat moves a sufficient distance toward the seat front side, and excellent getting-on/off properties of an occupant seated in a rear-row seat are obtained. Also, by simply tilting the seat back forward to push the seat forward, the vehicle seat can be moved forward, and thus the operability is excellent.

On the other hand, in the case of returning the vehicle seat to its original position after the vehicle seat is moved forward in order to allow the occupant seated in the rear-row seat to get on or off, the vehicle seat, for example, the seat back is pushed backward to thereby allow the lower slide, which is integrally provided with the upper slide and located at the tip end position of the lower slide rail, to move to the rear end position of the lower slide rail.

The seat back of the vehicle seat is tilted backward until the lower slide reaches the rear end position of the lower slide rail or after the lower slide reaches the rear slide rail, thereby causing the lower lock mechanism to fix the lower slide to the lower slide rail at the rear end position of the lower slide rail. Further, the fixation of the upper slide and the lower slide is released by the vertical slide lock mechanism.

Therefore, when the vehicle seat, for example, the seat back is pushed toward the seat rear side, the upper slide from which the fixation with the lower slide is released moves from the tip end position of the upper slide rail to the rear end position, and the upper lock mechanism fixes the upper slide to the upper slide rail. That is, the vehicle seat is returned to a predetermined position.

As described above, in the seat slide mechanism according to the first aspect, in a case in which the vehicle seat in a front row is moved, for example, when an occupant seated in a rear-row seat is allowed to get on or off, the upper slide and the lower slide are allowed to slide on the two-stage rail of the upper slide rail and the lower slide rail, respectively, to move toward the seat front side simply by pushing it forward simply by pushing the seat forward while tilting the seat back of the vehicle seat forward.

In addition, in the case of returning the vehicle seat of the front-row seat to the original position, the upper slide and the lower slide are allowed to slide on the two-stage rail of the upper slide rail and the lower slide rail, respectively, to move toward the seat rear side and the vehicle seat can be returned to the original position simply by pushing the seat back backward while tilting the seat back of the vehicle seat backward.

That is, according to the seat slide mechanism of the first embodiment, operability is excellent during the walk-in operation and a walk-in return operation.

In addition, the sufficient amount of movement of the vehicle seat toward the seat front side can be secured, and excellent getting-on/off properties of the occupant seated in the rear-row seat are obtained.

In the seat slide mechanism according to the first aspect, according to a seat slide mechanism of a second aspect, the vertical slide lock mechanism includes, a pin provided at the upper slide, an engaging member provided at the lower slide and including a recess for accommodating and engaging with the pin in a case in which the upper slide reaches the tip end position of the upper slide rail, and an engagement releasing mechanism configured to release an engagement state between the engaging member and the pin in a case in which the lower slide is moved to the rear end position of the lower slide rail.

In this seat slide mechanism, during the walk-in operation, the upper slide is moved to the tip end position on the upper slide rail, so that the pin provided at the upper slide is accommodated in the recess of the engaging member provided on the lower slide and engages with the engaging member. As a result, the upper slide is fixed to the lower slide.

On the other hand, during the walk-in return operation, the lower slide integrally provided with the upper slide moves to the rear end position on the lower slide rail. As a result, an engagement state between the engaging member and the pin is released by an engagement release mechanism. That is, the pin comes out of the recess of the engaging member. As a result, the fixation of the upper slide with respect to the lower slide is released.

In the seat slide mechanism according to the second aspect, according to a seat slide mechanism of a third aspect, forward tilting of the seat back allows the pin to move to a lower position, and backward tilting of the seat back allows the pin to move to an upper position, the pin located at the lower position being accommodated in the recess of the engaging member.

In this seat slide mechanism, during the walk-in operation, forward tilting of the seat back allows the pin provided at the upper slide moves to the lower position. In this state, when the upper slide moves to the tip end position on the upper slide rail, the pin located at the lower position is accommodated in the recess of the engaging member of the lower slide, and the upper slide is fixed to the lower slide.

On the other hand, during the walk-in return operation, the engagement state with the engaging member is released by the engagement release mechanism, and the pin which has come out of the recess moves to the upper position due to backward tilting of the seat back.

In this manner, setting the pin to the upper position at the end of the walk-in return operation makes it possible to reliably prevent the pin from being accommodated in the recess of the engaging member and being brought into the engagement state during a normal seat sliding operation.

In the seat slide mechanism according to the first aspect, according to a seat slide mechanism of a fourth aspect, the upper lock mechanism includes, a first engaged part provided at the upper slide rail, a first engaging part provided at the upper slide and configured to be deformed or displaced to engage with the first engaged part or release the engagement, and an urging unit provided at the upper slide and configured to urge the first engaging part to be deformed or displaced in a direction away from the first engaged part in a case in which the seat back is tilted forward, and to urge the first engaging part to be deformed or displaced in a direction approaching the first engaged part in a case in which the seat back is tilted backward.

When the seat back is tilted forward, the urging unit urges the first engaging part in the direction away from the first engaged part. As a result, the first engaging part is deformed or displaced in the direction away from the first engaged part, thereby releasing the engagement state between the first engaging part and the first engaged part. As a result, the fixation of the upper slide with respect to the upper slide rail is released.

On the other hand, back tilting of the seat back allows the urging unit to urge the first engaging part to be deformed or displaced in a direction approaching the first engaged part. As a result, the first engaging part is deformed or displaced toward the first engaged part and engages with the first engaged part. As a result, the upper slide is fixed to the upper slide rail.

In the seat slide mechanism according to the fourth aspect, according to a seat slide mechanism of a fifth aspect, the upper lock mechanism includes an engagement release state maintaining unit configured to maintain an engagement release state in a case in which forward tilting of the seat back allows the first engaging part to release the engagement of the first engaged part.

In this seat slide mechanism, when the first engaging part is allowed to engage with the first engaged part by the upper lock mechanism, the engagement release state is maintained by the engagement release state maintaining means. That is, even when the forward tilted state of the seat back is not maintained, the fixation release state of the upper slide with respect to the upper slide rail can be reliably maintained.

In the seat slide mechanism according to the first aspect, according to a seat slide mechanism of a sixth aspect, the lower lock mechanism includes, a second engaged part provided at the lower slide rail, a second engaging part provided at the lower slide and configured to be displaced or deformed to engage with the second engaged part, and a driving unit configured to cause the second engaging part to be displaced or deformed toward the second engaged part to engage with the second engaged part in a case in which the lower slide reaches the rear end position of the lower slide rail.

During the walk-in return operation, the upper slide and the lower slide are fixed by the vertical slide lock mechanism. Accordingly, the lower slide integrally provided with the upper slide moves to the rear end position on the lower slide rail and a seat cushion is tilted backward, so that the second engaging part of the lower slide is deformed or displaced toward the second engaged part by the driving unit of the lower lock mechanism, and the second engaging part and the second engaged part engage with each other. That is, the lower slide is fixed to the lower slide rail.

In the seat slide mechanism according to the first aspect, according to a seat slide mechanism of a seventh aspect, the upper slide includes an operation lever configured to be operated to release fixation of the upper lock mechanism.

In this seat slide mechanism, operating the operation lever during a normal seat slide operation makes it possible to release the fixation of the upper lock mechanism, that is, enables the upper slide to slide relative to the upper slide rail. As a result, the vehicle seat can be moved to an arbitrary position.

As described above, the seat slide mechanisms according to the first, second, fourth, and sixth aspects are excellent in operability in a case where the front-row seat is moved in the seat front-back direction when an occupant seated in a rear-row seat gets on or off, and are also excellent in getting-on/off properties of the occupant seated in the rear-row seat.

The seat slide mechanism according to the fifth aspect can reliably maintain the fixation release state of the upper lock mechanism during the walk-in operation.

The seat slide mechanism according to the third and seventh aspects can favorably perform normal seat position adjustment.

BRIEF DESCRIPTION OF THE DRAWINGS

Exemplary embodiments of the present invention will be described in detail based on the following figures, wherein:

FIG. 11 is a perspective view illustrating the upper lock mechanism according to an embodiment;

Figure 15:
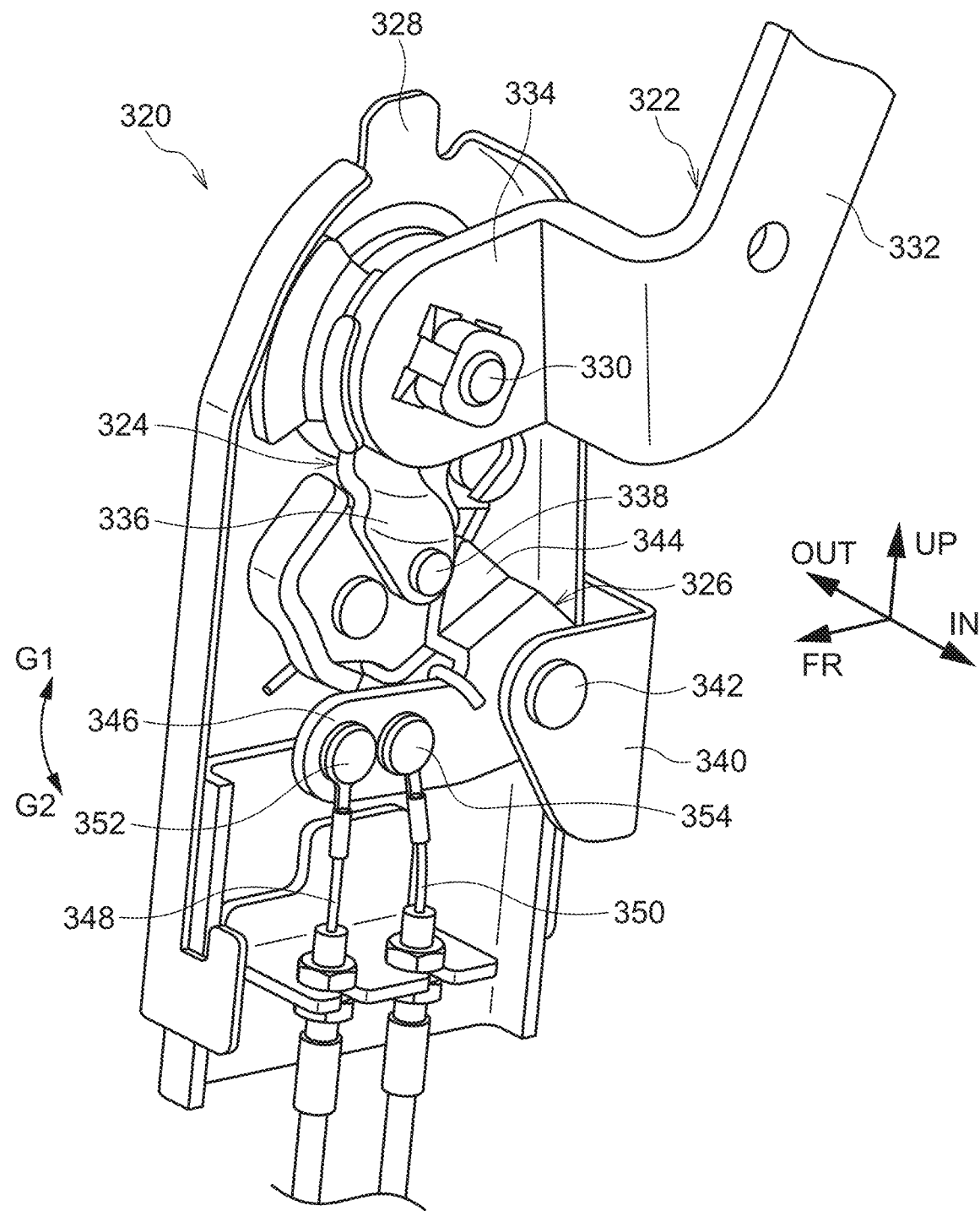
Figure 18:
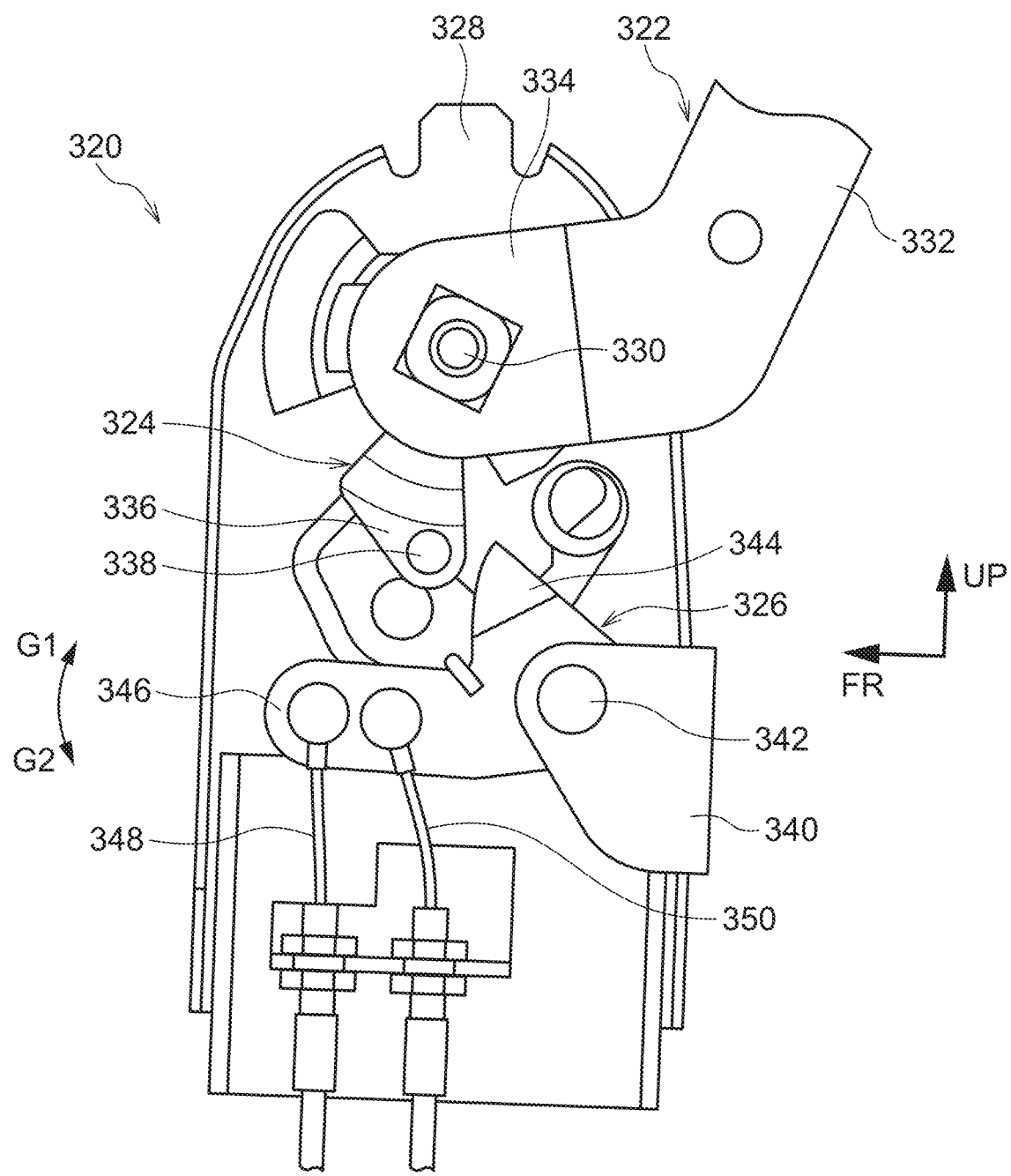
Figure 19:
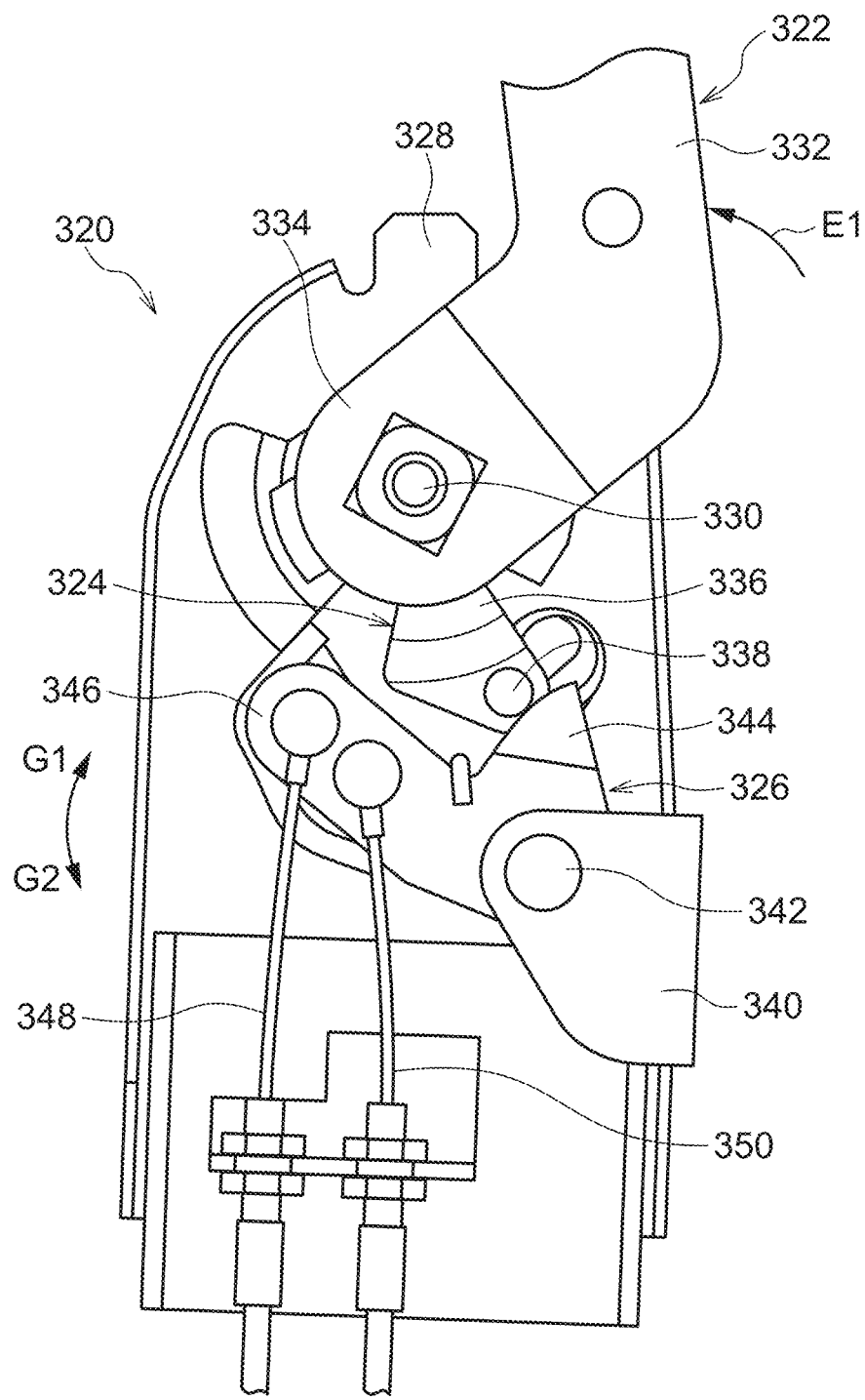
Figure 20:
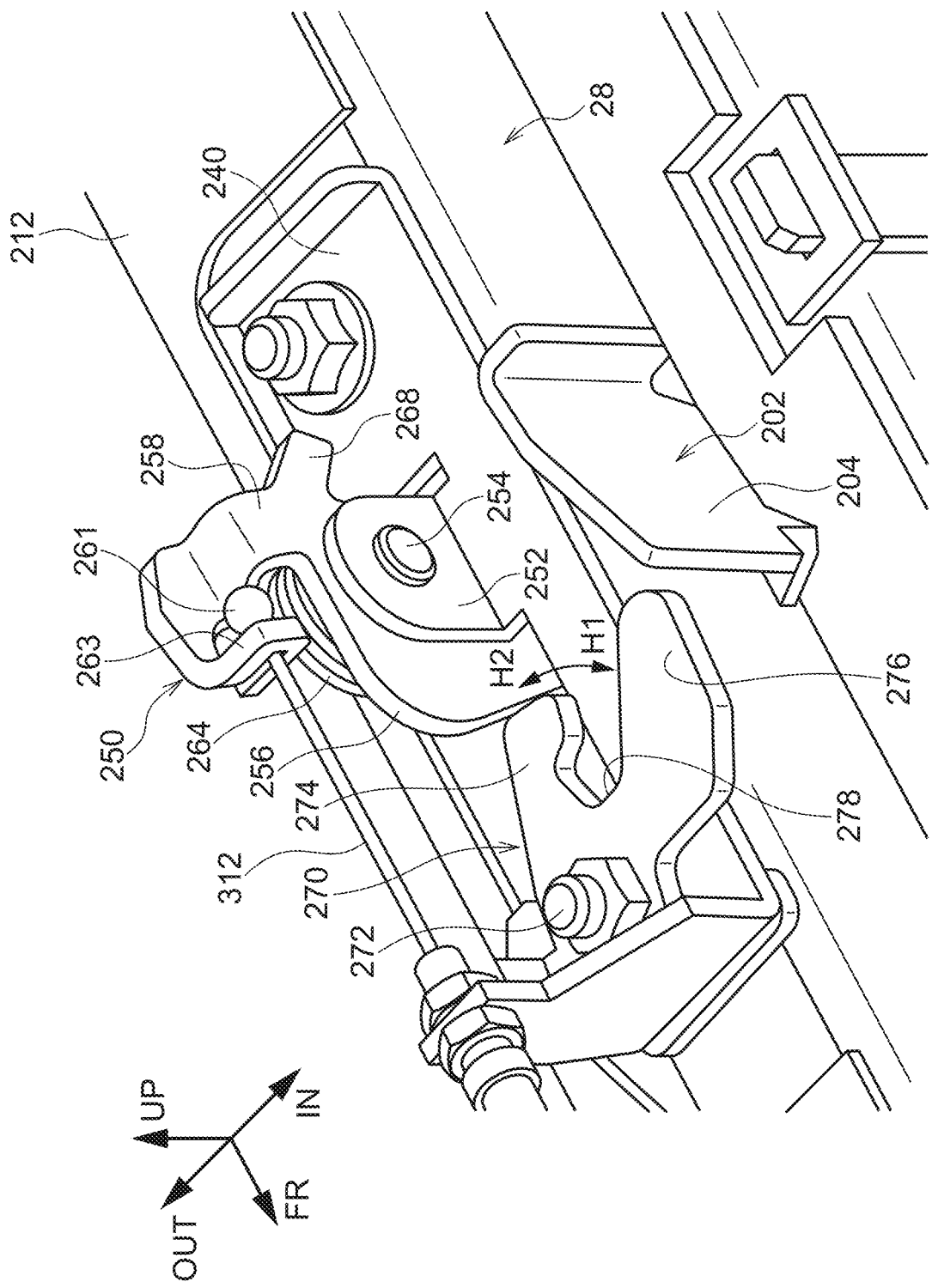
Figure 21:
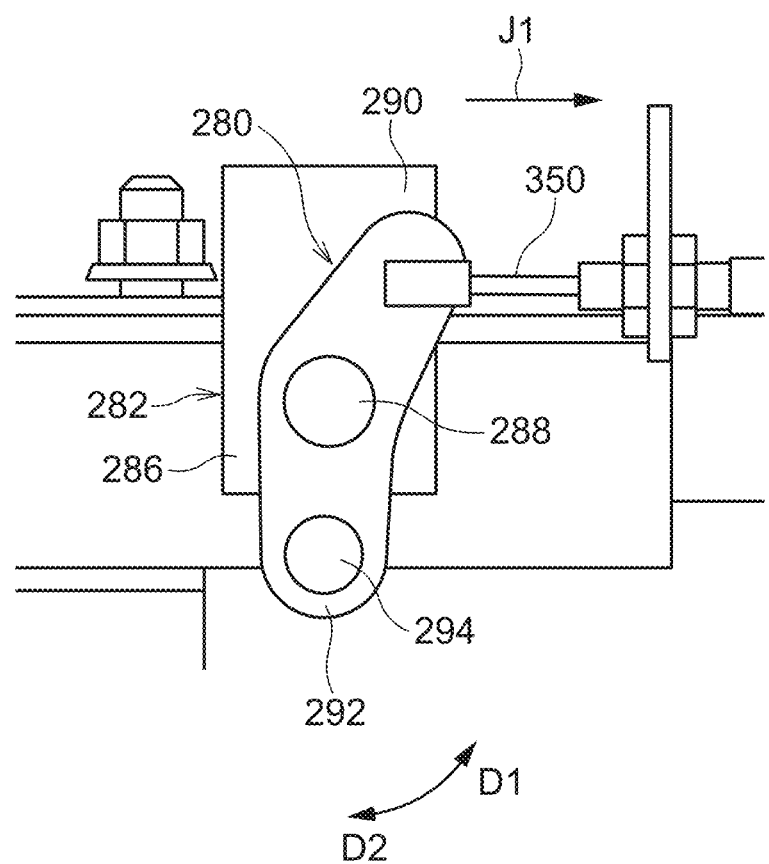
Figure 22:
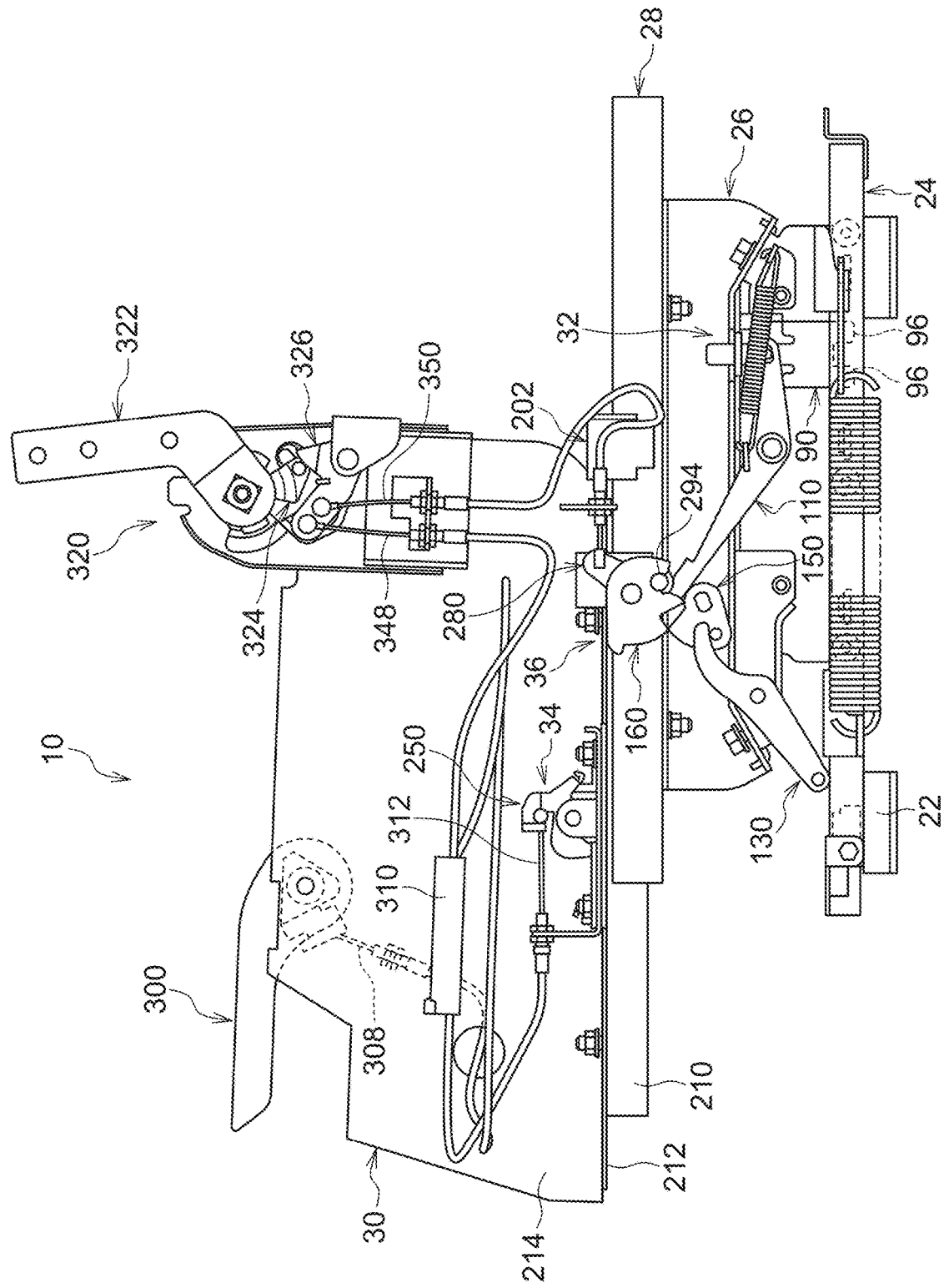
Figure 23:
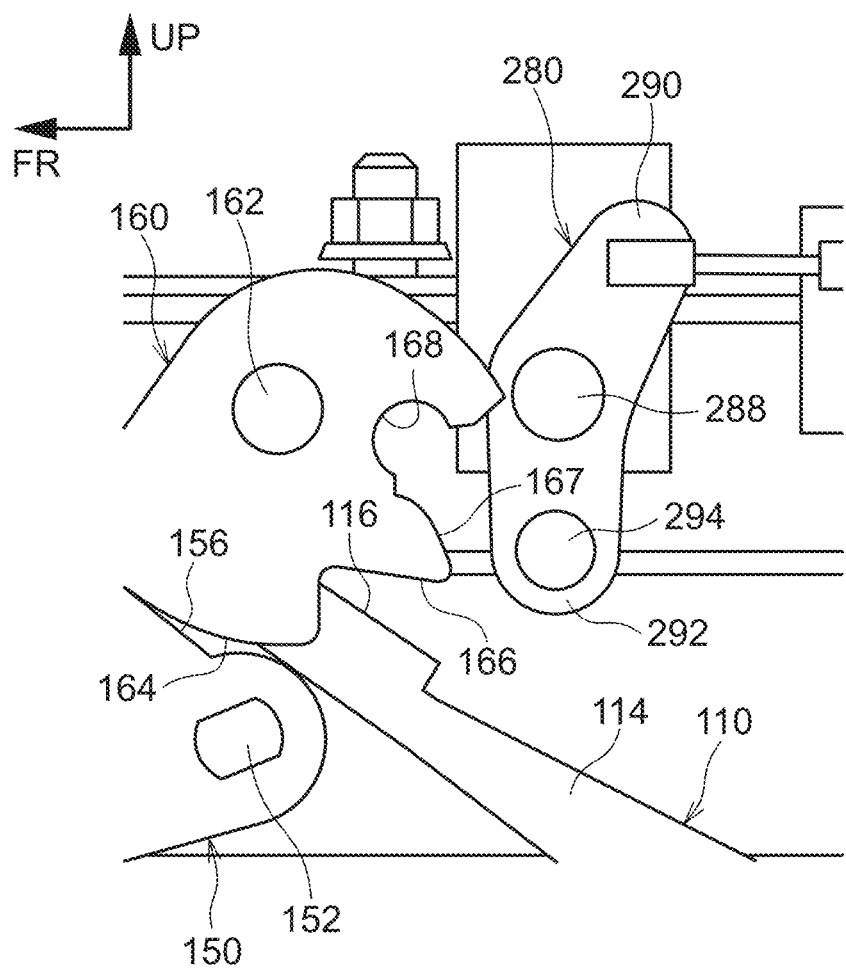
Figure 24:
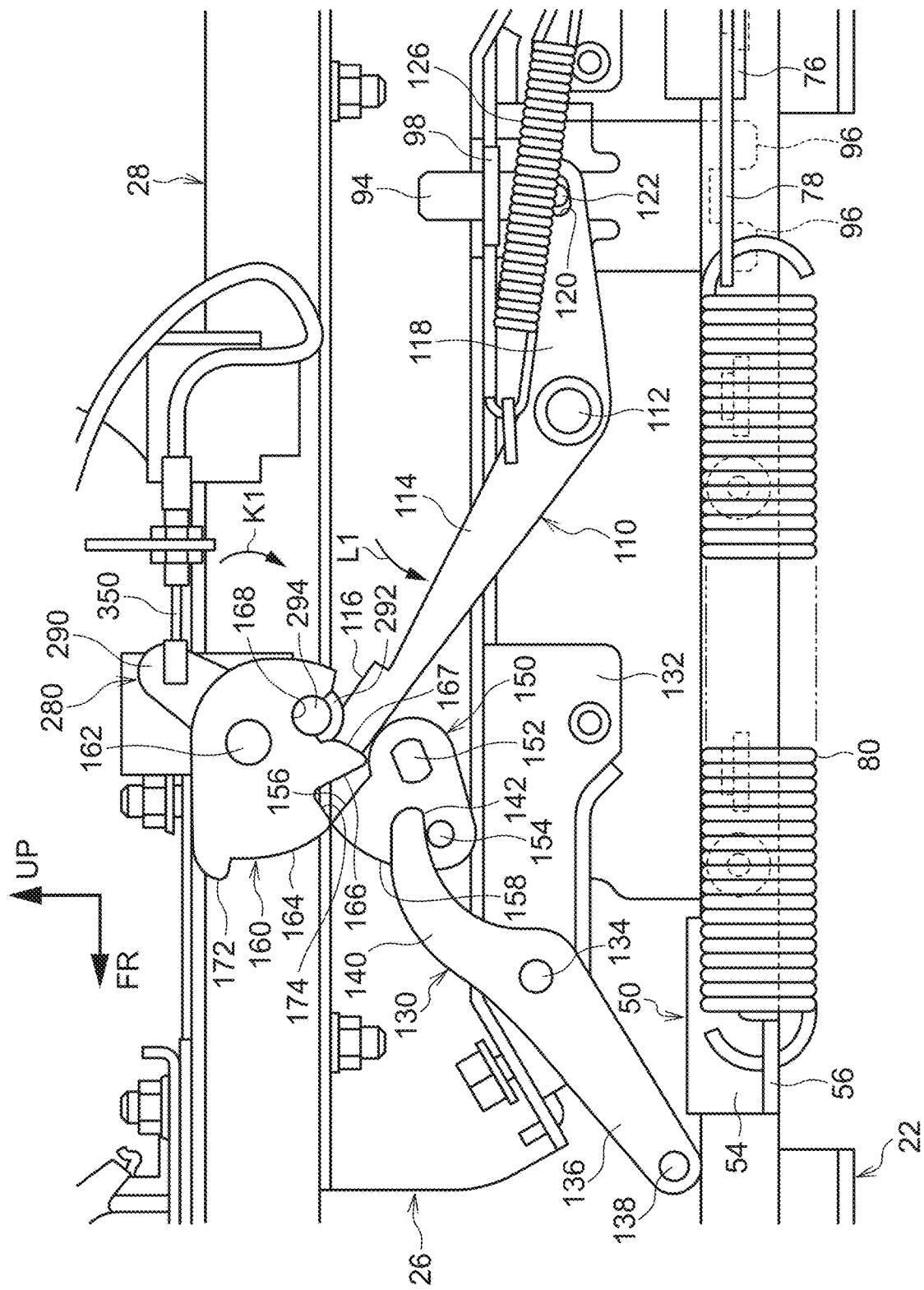
Figure 25:
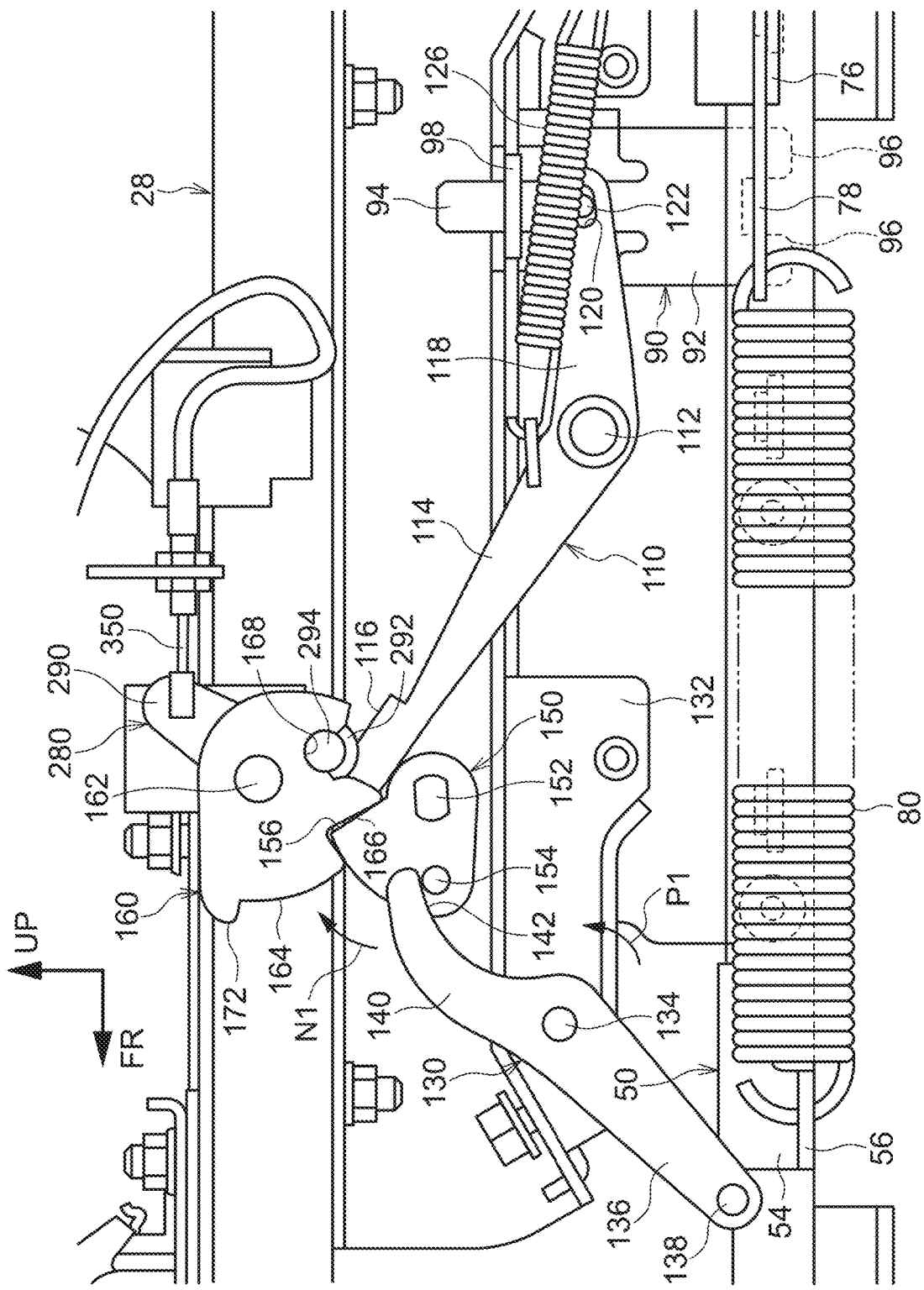
Figure 26:
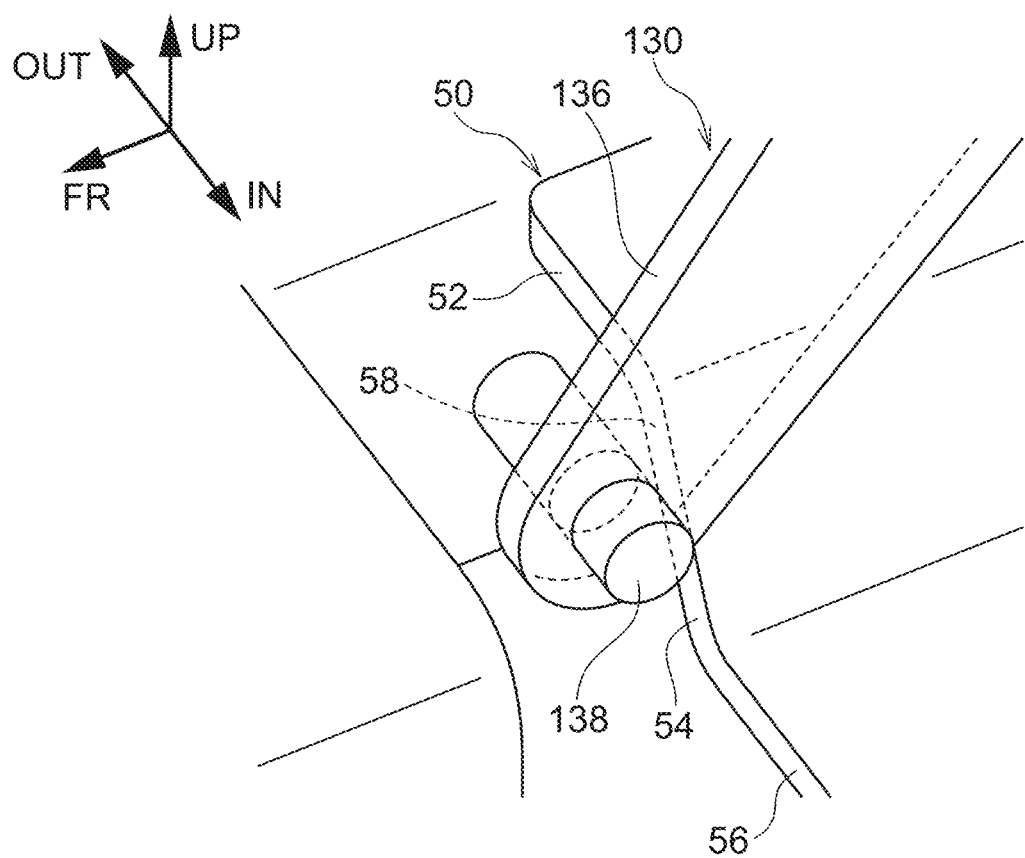
Figure 27:
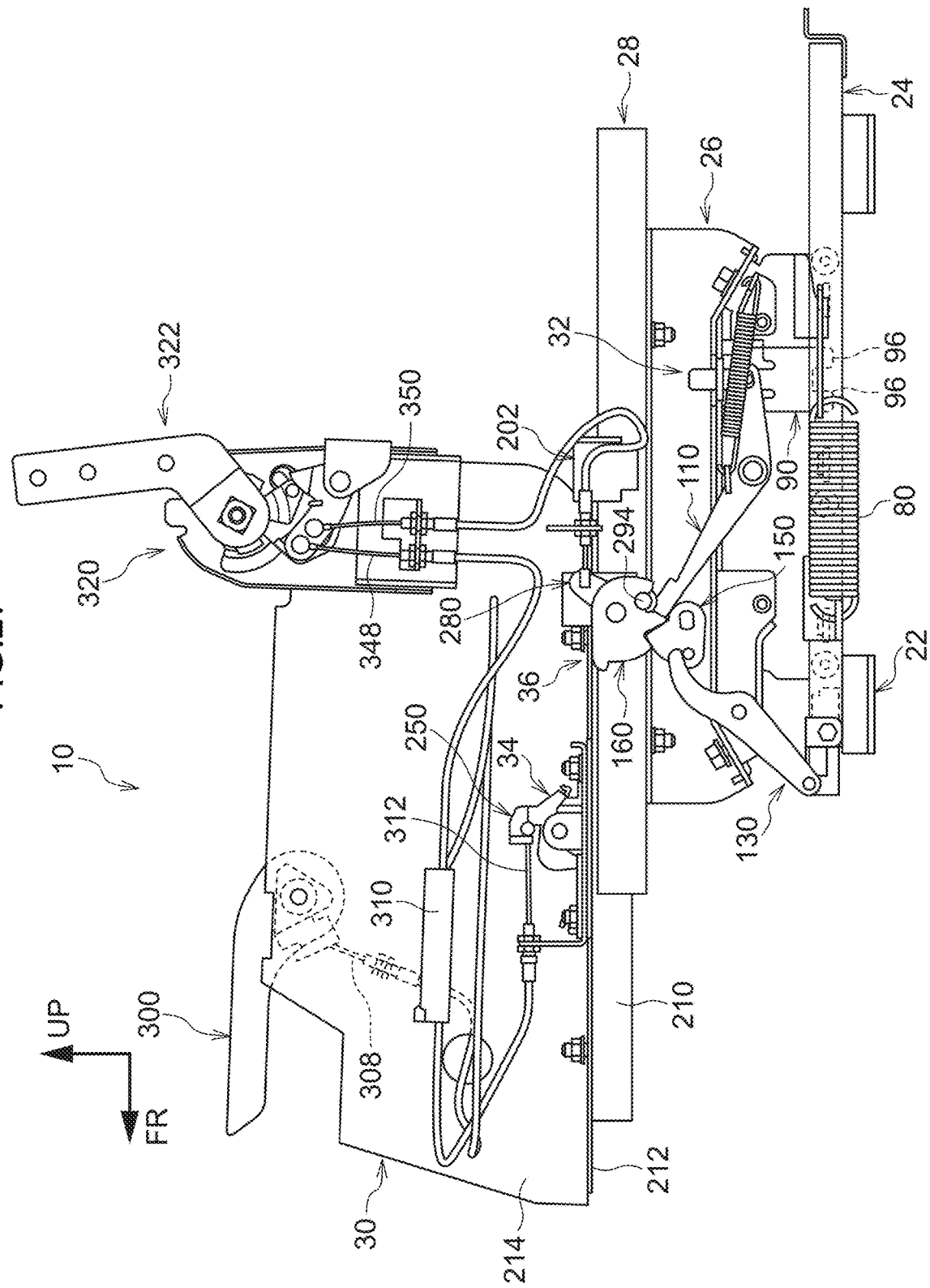
Figure 28A:
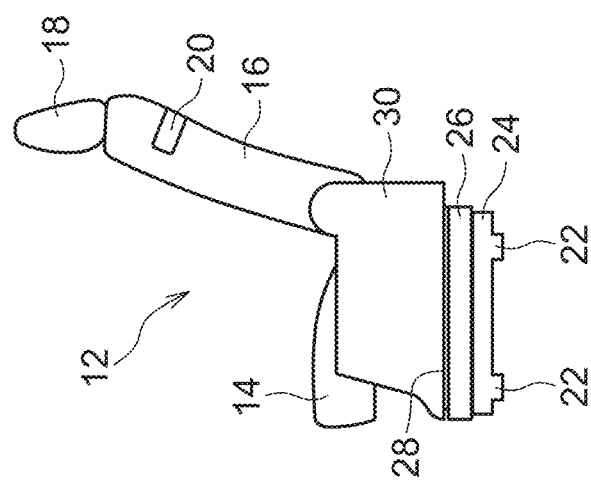
Figure 28B:
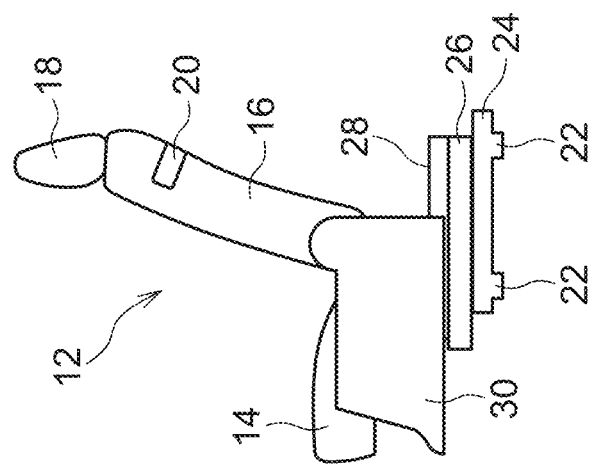
Figure 28C:
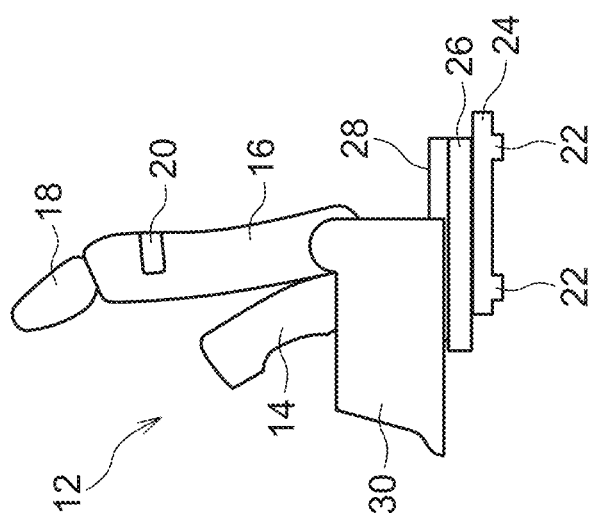
Figure 30:
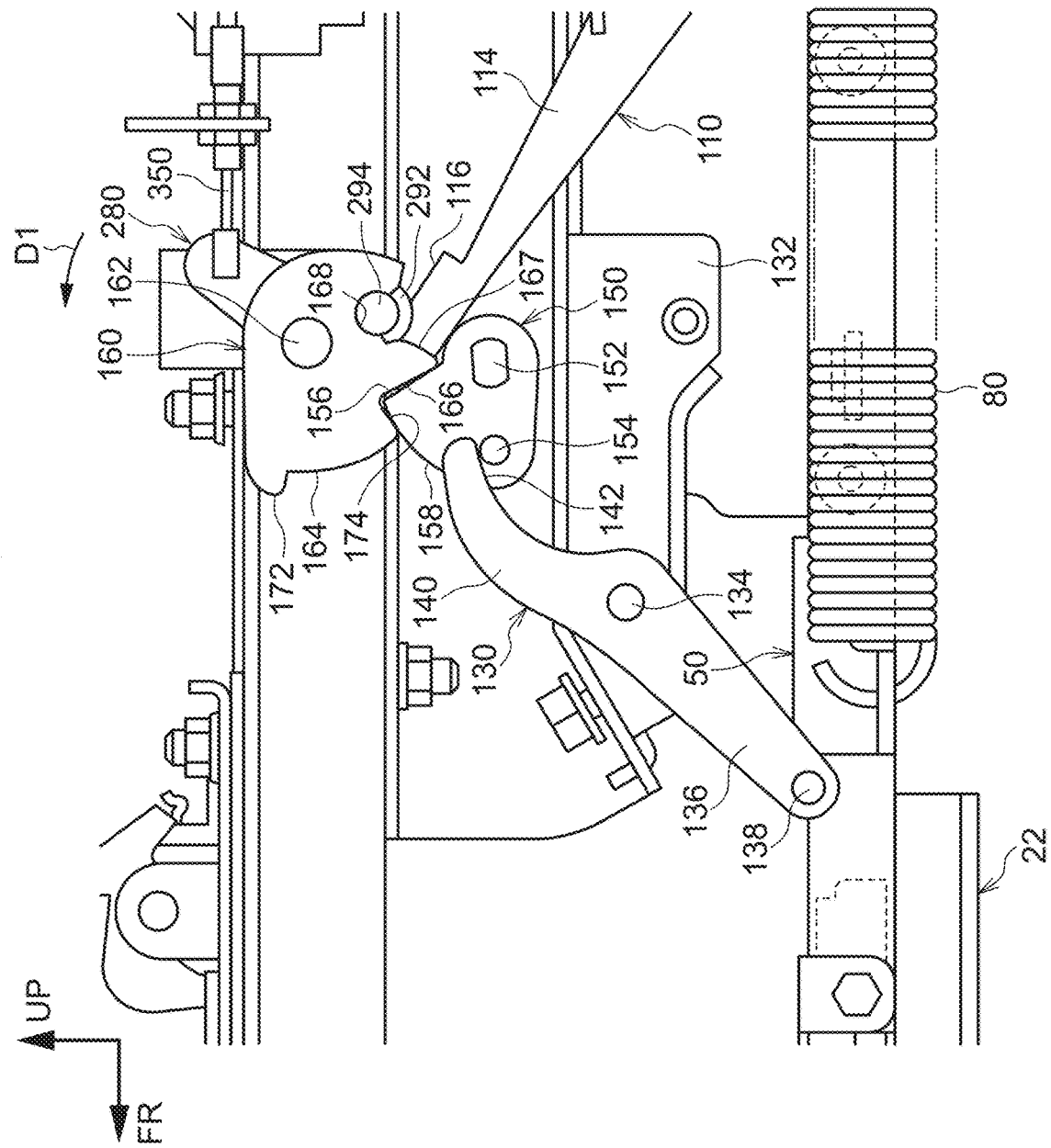
Figure 31:
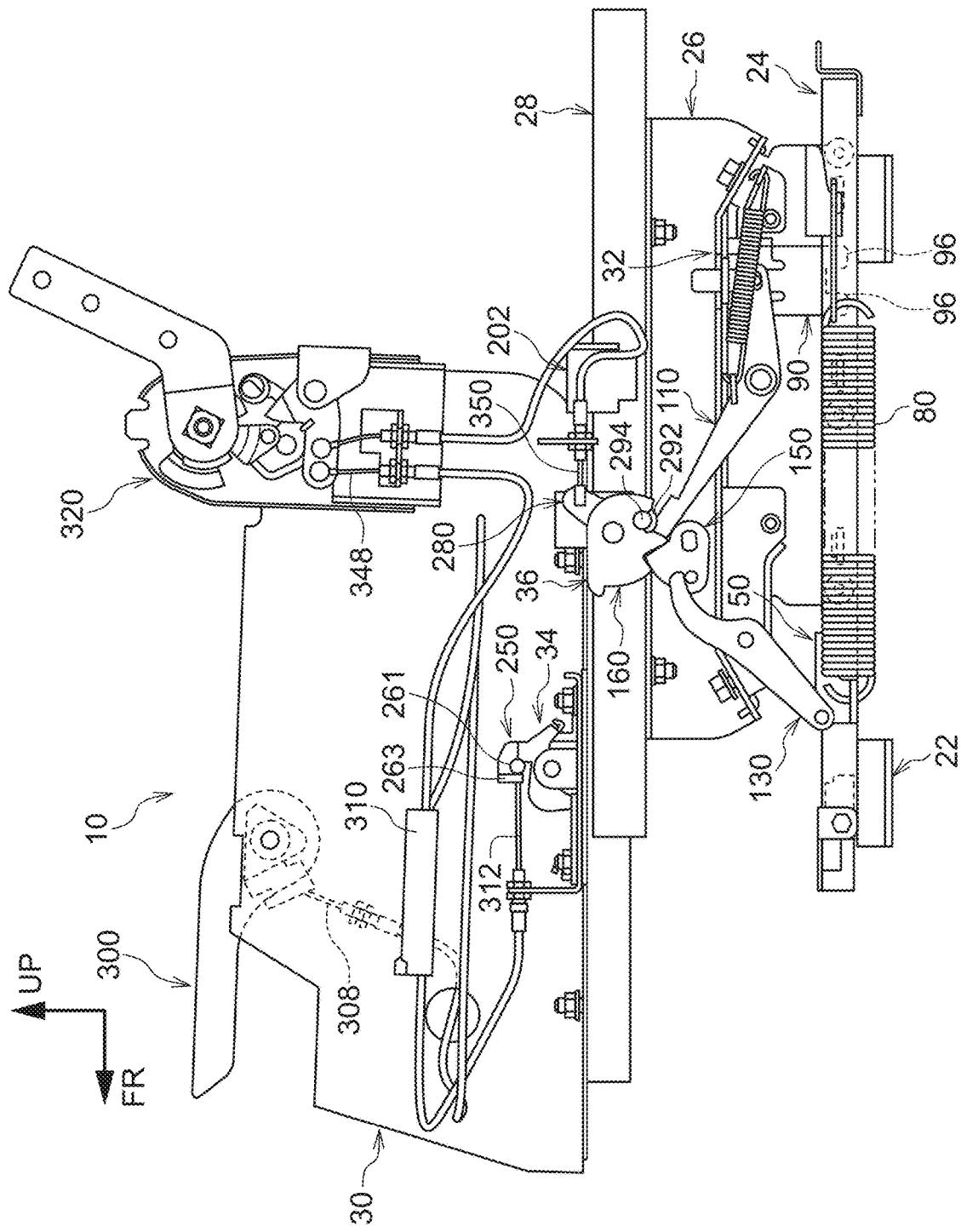
Figure 32:
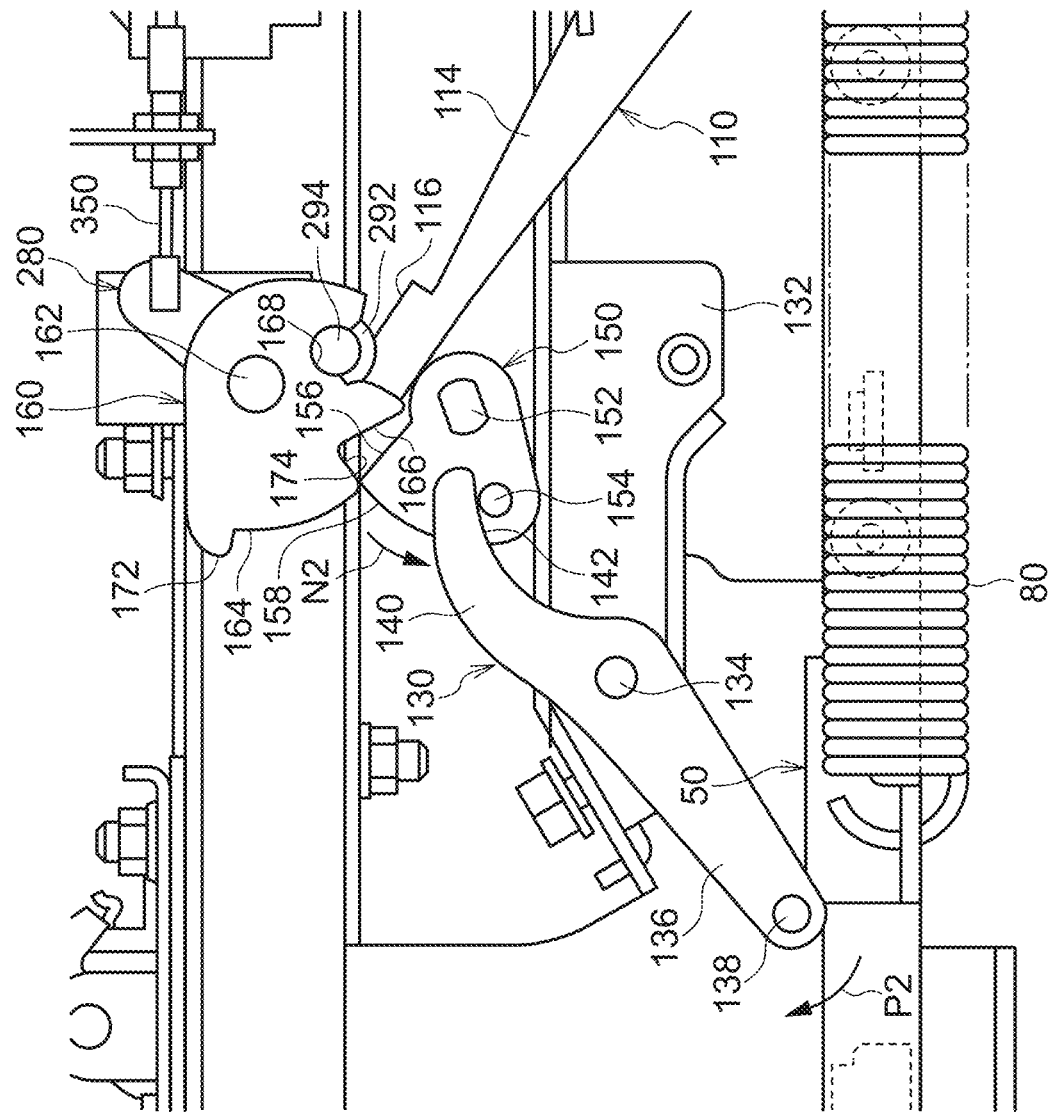
Figure 33:
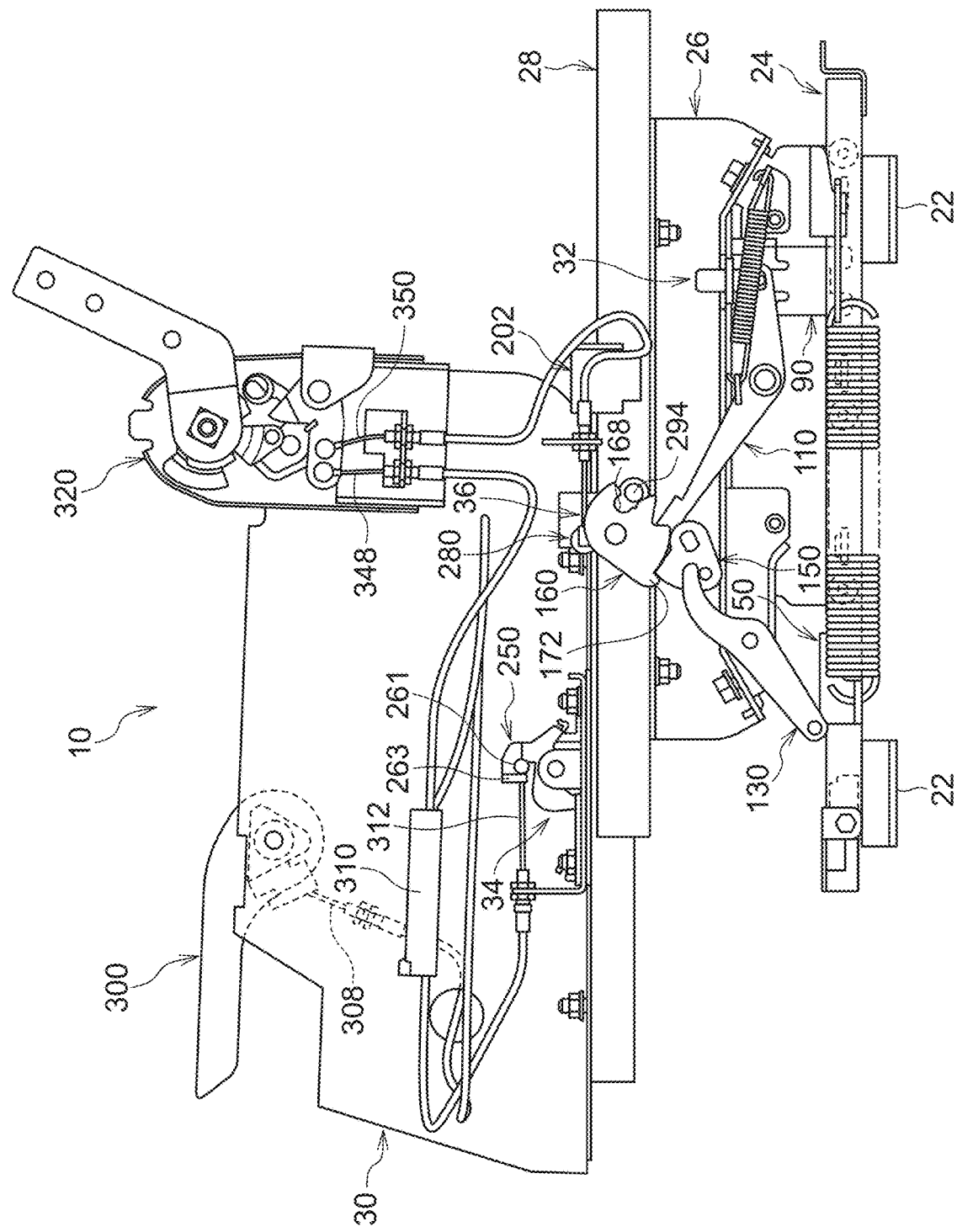
Figure 34:
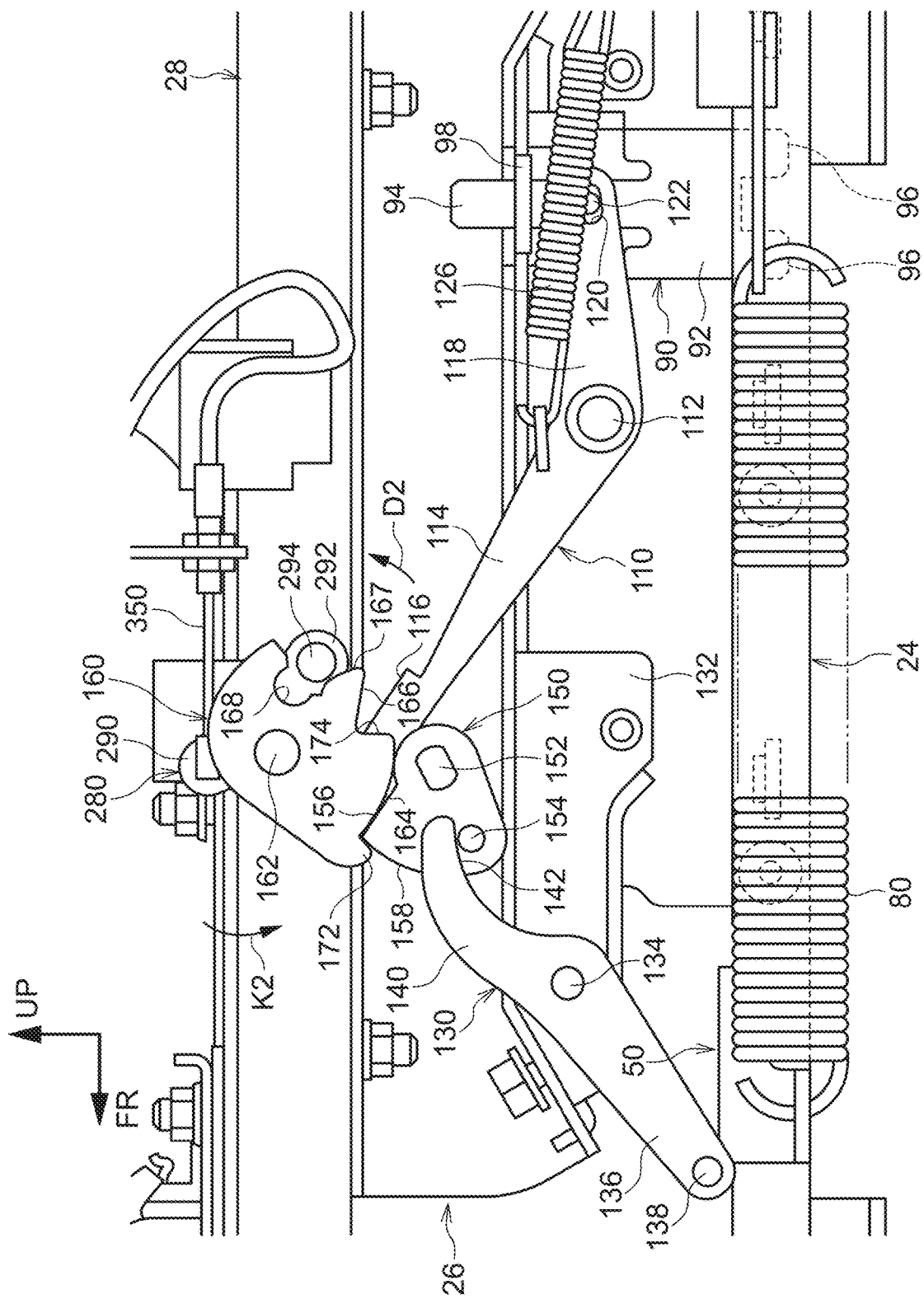
Figure 35:
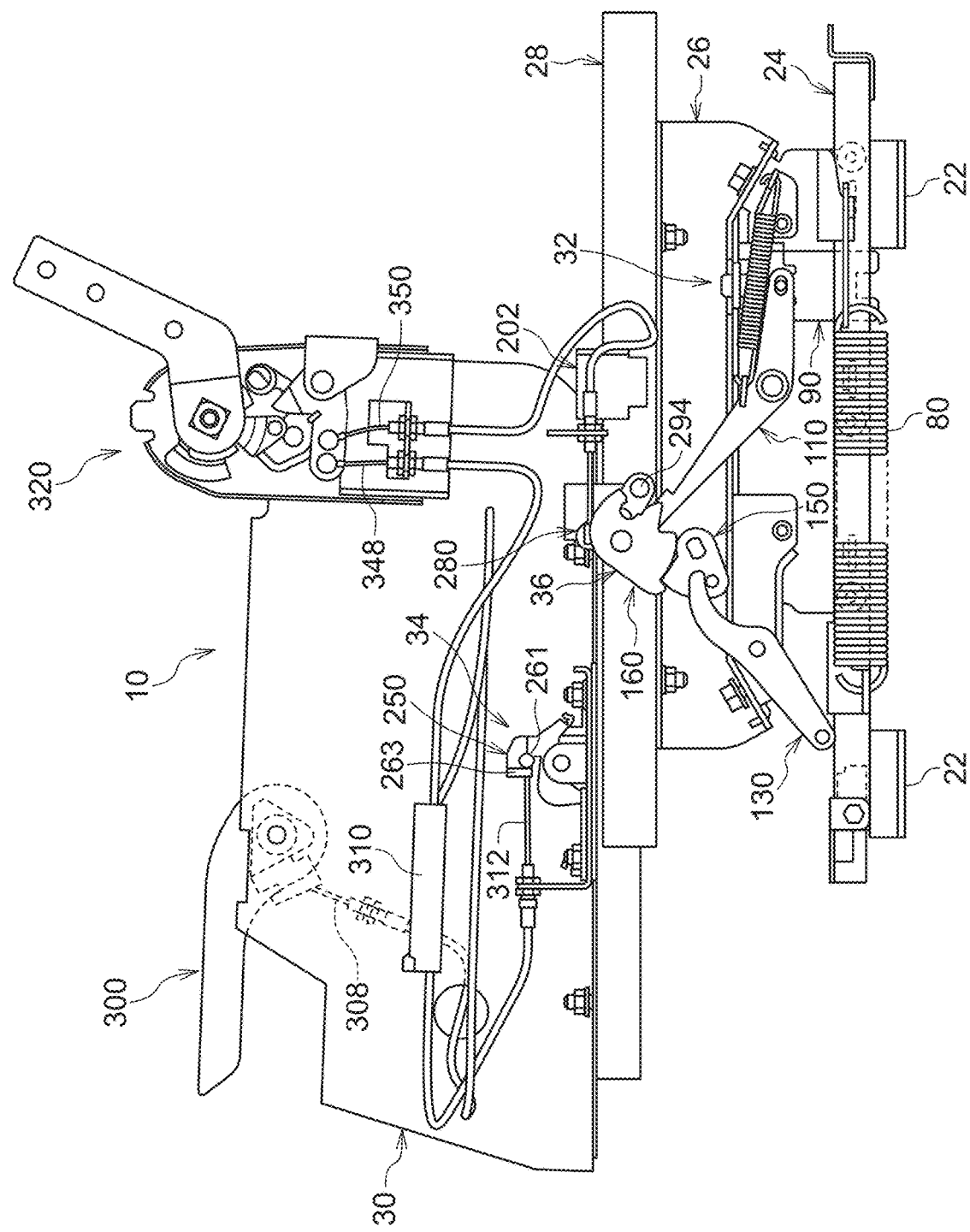
Figure 36:
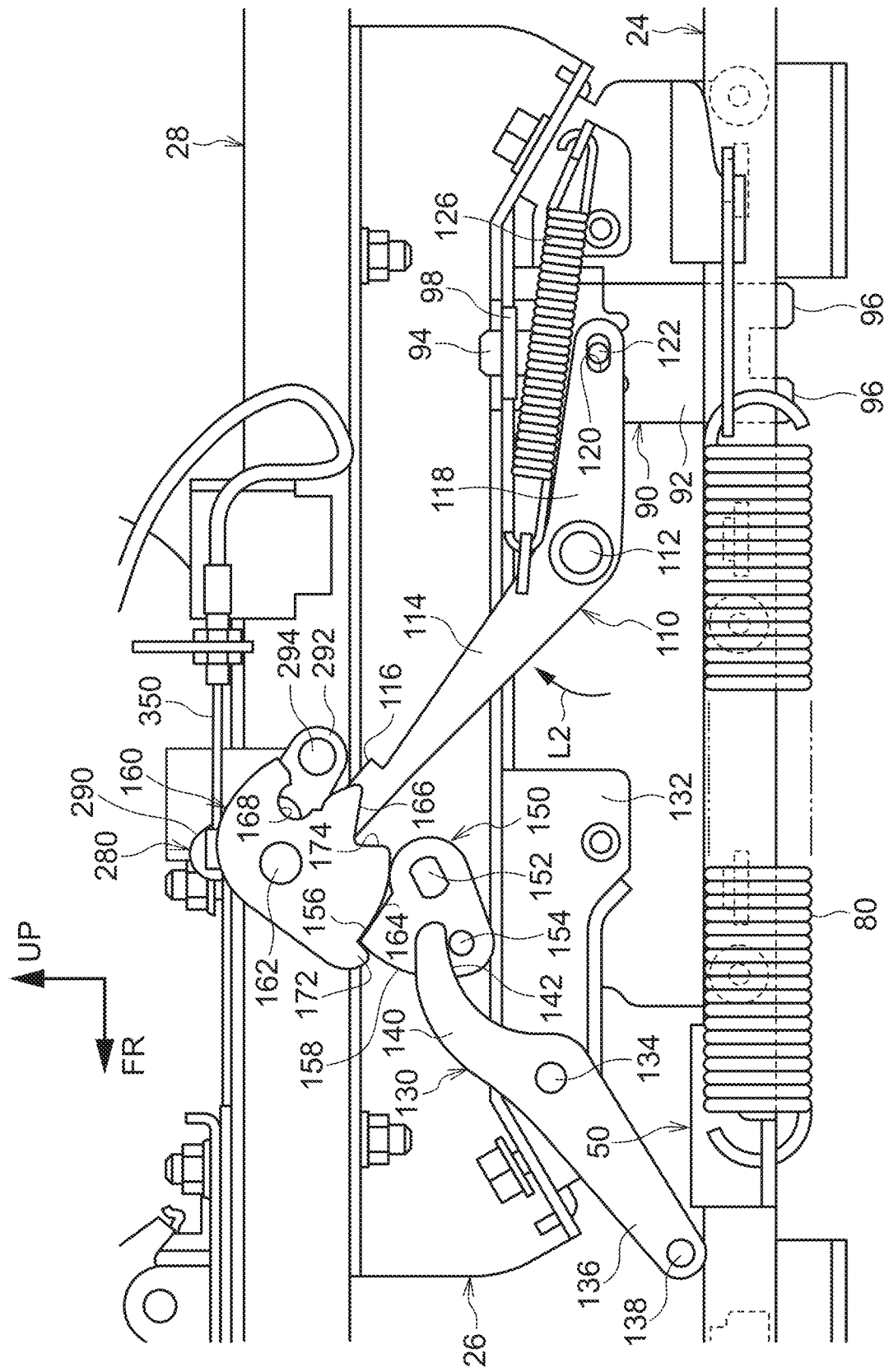

14 is a side view illustrating a state where a seat back is tilted forward during the walk-in operation of the seat slide mechanism according to an embodiment;

FIG. 15 is a perspective view illustrating a recliner operation mechanism according to an embodiment;

FIG. 16 is a side view illustrating a normal operation state of the seat slide mechanism according to an embodiment;

FIG. 17A is a side view illustrating a start state of a vehicle seat and the seat slide mechanism according to an embodiment during the walk-in operation, FIG. 17B is a side view illustrating a forward tilted state of the seat during the walk-in operation, and FIG. 17C is a side view illustrating an end state during the walk-in operation;

FIG. 18 is an enlarged side view illustrating a start state during the walk-in operation of the recliner operation mechanism according to an embodiment;

FIG. 19 is an enlarged side view of an essential part illustrating a state where the seat back is tilted forward during the walk-in operation of the recliner operation mechanism according to an embodiment;

FIG. 20 is a perspective view illustrating the unlock maintaining state of the upper lock mechanism according to an embodiment;

FIG. 21 is a side view illustrating a state where the seat back is tilted forward during the walk-in operation of the unlocking link according to an embodiment;

FIG. 22 is a side view illustrating a state where the upper slide is located at the tip end position of the upper slide rail during the walk-in operation of the seat slide mechanism according to an embodiment;

FIG. 23 is an enlarged side view of the main part of a vertical slide lock mechanism illustrating a state immediately before the upper slide reaches the tip end position of the upper slide rail during the walk-in operation of the seat slide mechanism according to an embodiment;

FIG. 24 is an enlarged side view illustrating a state where the upper slide is located at the tip end position of the upper slide rail during the walk-in operation of the seat slide mechanism according to an embodiment;

FIG. 25 is an enlarged side view illustrating a state where the upper slide is located at the tip end position of the upper slide rail during the walk-in operation of the seat slide mechanism according to an embodiment;

FIG. 26 is an enlarged perspective view of the main part illustrating a relationship between an A-link and a release bracket at the time when the lower slide reaches the rear end position of the lower slide rail during a walk-in return operation of the seat slide mechanism according to an embodiment;

FIG. 27 is a side view illustrating an end state during the walk-in operation walk-in operation, or a start state during the walk-in return operation of the seat slide mechanism according to an embodiment;

FIG. 28A is a side view illustrating a start state during the walk-in return operation in the vehicle seat and the seat slide mechanism according to an embodiment, FIG. 28B is a side view illustrating a state where the seat back is tilted backward during the walk-in return operation, and FIG. 28C is a side view illustrating the end state during the walk-in return operation;

FIG. 29 is a side view illustrating a state where the seat back is tilted backward during the walk-in return operation of the seat slide mechanism according to an embodiment;

FIG. 30 is an enlarged side view of the main part illustrating a state where the lower slide has reached the rear end position immediately before the lower slide reaches an overrun position of the lower slide rail during the walk-in return operation of the seat slide mechanism according to an embodiment;

FIG. 31 is a side view illustrating a state where the lower slide has reached the overrun position of the lower slide rail during the walk-in return operation of the seat slide mechanism according to an embodiment;

FIG. 32 is an explanatory diagram illustrating an operation of the vertical slide lock mechanism in a state where the lower slide has reached the overrun position of the lower slide rail during the walk-in return operation of the seat slide mechanism according to an embodiment;

FIG. 33 is a side view illustrating a state where the lower slide has reached the overrun position of the lower slide rail during the walk-in return operation of the seat slide mechanism according to an embodiment;

FIG. 34 is an explanatory diagram illustrating an operation of the vertical slide lock mechanism in a state where the lower slide has reached the overrun position of the lower slide rail during the walk-in return operation of the seat slide mechanism according to an embodiment;

FIG. 35 is a side view illustrating a state where the lower slide has reached the rear end position after reaching the overrun position of the lower slide rail during the walk-in return operation of the seat slide mechanism according to an embodiment;

FIG. 36 is an enlarged side view of the main part illustrating a state where the lower slide has reached the rear end position after reaching the overrun position of the lower slide rail during the walk-in return operation of the seat slide mechanism according to an embodiment; and FIG. 37 is a side view illustrating an end state during the walk-in return operation of the seat slide mechanism according to an embodiment.

DETAILED DESCRIPTION

A vehicle seat 12 to which a seat slide mechanism 10 according to an embodiment of the disclosure is applied will be described with reference to FIGS. 1 to 37. Each figure is schematically illustrated and the illustration of parts which are less relevant to the disclosure is omitted. In each figure, an arrow FR indicates a front side of the seat, an arrow UP indicates an upper side of the seat, an arrow IN indicates the inside in a seat width direction, and an arrow OUT indicates the outside in the seat width direction.

[Structure]
(Vehicle Seat)

First, the vehicle seat 12 including the seat slide mechanism 10 according to the present embodiment will be described.

As illustrated in FIG. 17A, the vehicle seat 12 includes a seat cushion 14, a seat back 16 which is tiltably attached to a rear end of the seat cushion 14, and a headrest 18 which is attached to an upper part of the seat back 16.

At a shoulder part on the outside in the seat width direction of the seat back 16 of the vehicle seat 12, a lever 20 that causes the seat back 16 to be tilted forward through an operation during the walk-in operation and causes the seat cushion 14 (see FIG. 17B) to be flipped up is disposed.

(Seat Slide Mechanism)

Figure 1:
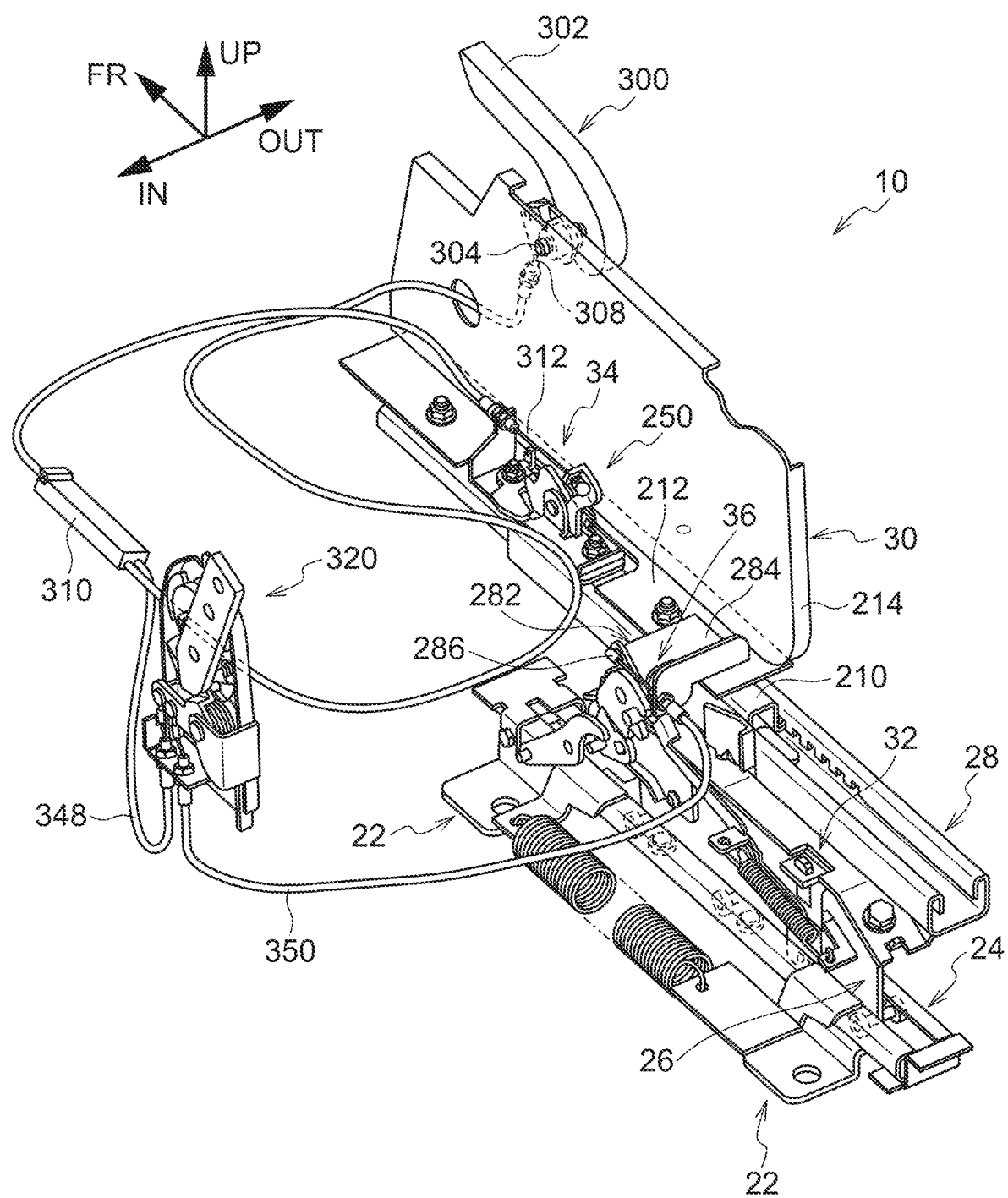
FIG. 1 is a partially cutaway schematic perspective view illustrating a seat slide mechanism according to an embodiment.
Figure 2:
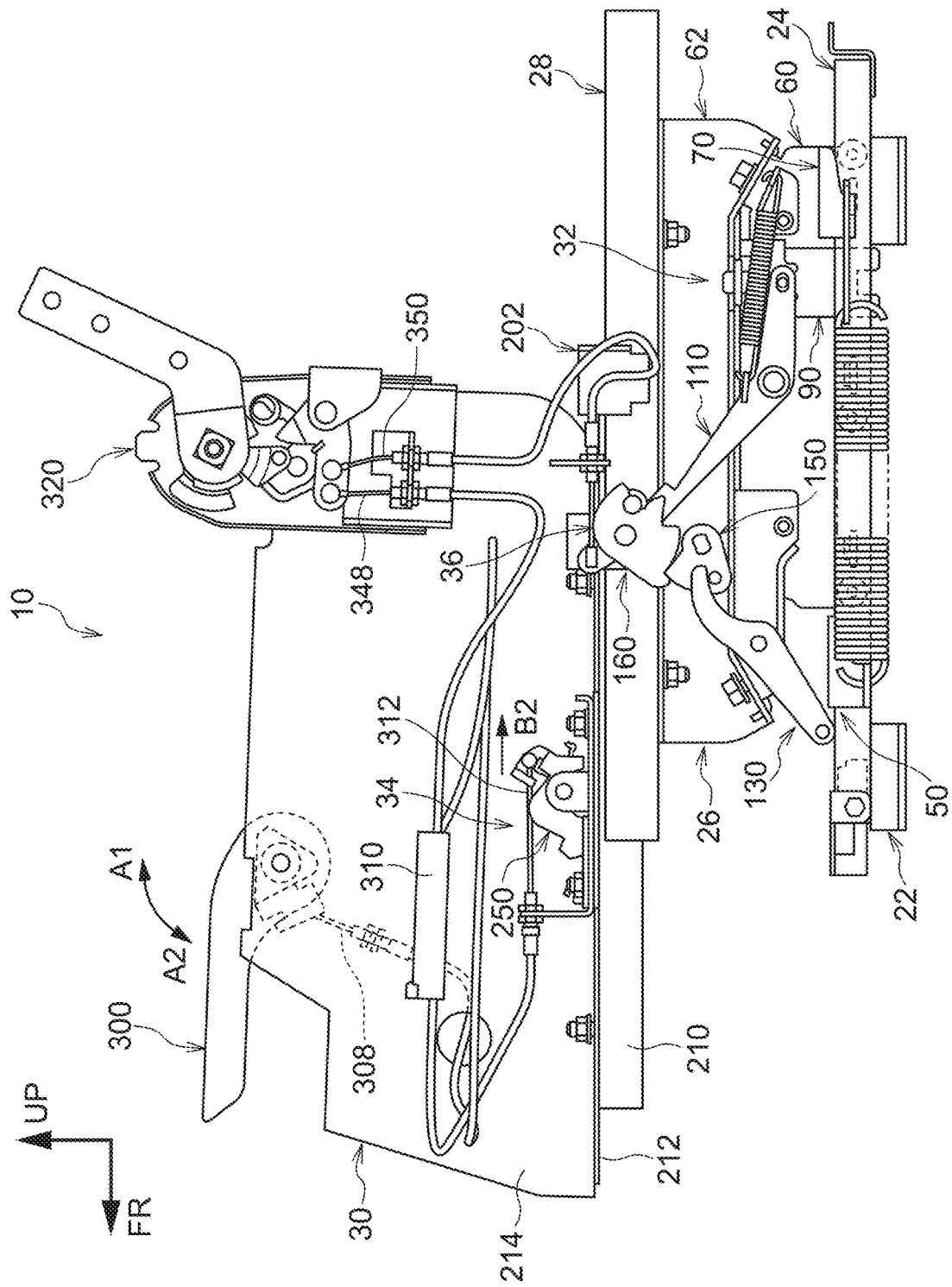
FIG. 2 is a side view of a seat slide mechanism according to an embodiment.

As illustrated in FIGS. 1 and 2, a pair of seat slide mechanisms 10 is provided at both ends in the seat width direction. Each seat slide mechanism includes a base 22 which is fixed to a floor panel (not illustrated) of an automobile, a lower slide rail 24 which is fixed to an upper part of the base 22, a lower slide 26 which is configured to be movable in the seat front-back direction on the lower slide rail 24, an upper slide rail 28 which is provided on an upper part of the lower slide 26, and an upper slide 30 which is configured to be movable in the seat front-back direction on the upper slide rail 28.

As illustrated in FIG. 1, each seat slide mechanism 10 includes a lower lock mechanism 32 for fixing (locking) the lower slide 26 and the lower slide rail 24 or releasing the fixation (locking), an upper lock mechanism 34 for fixing (locking) the upper slide 30 and the upper slide rail 28 or releasing the fixation (locking), and a vertical slide lock mechanism 36 for fixing (locking) the lower slide 26 and the upper slide 30 or releasing the fixation (locking).

A pair of the seat slide mechanisms 10 is provided in the seat width direction, except for an upper slide lever 300 to be described below. However, for convenience of description, only one of the seat slide mechanisms is illustrated in the drawings.

(Lower Slide Rail)

Figure 3:
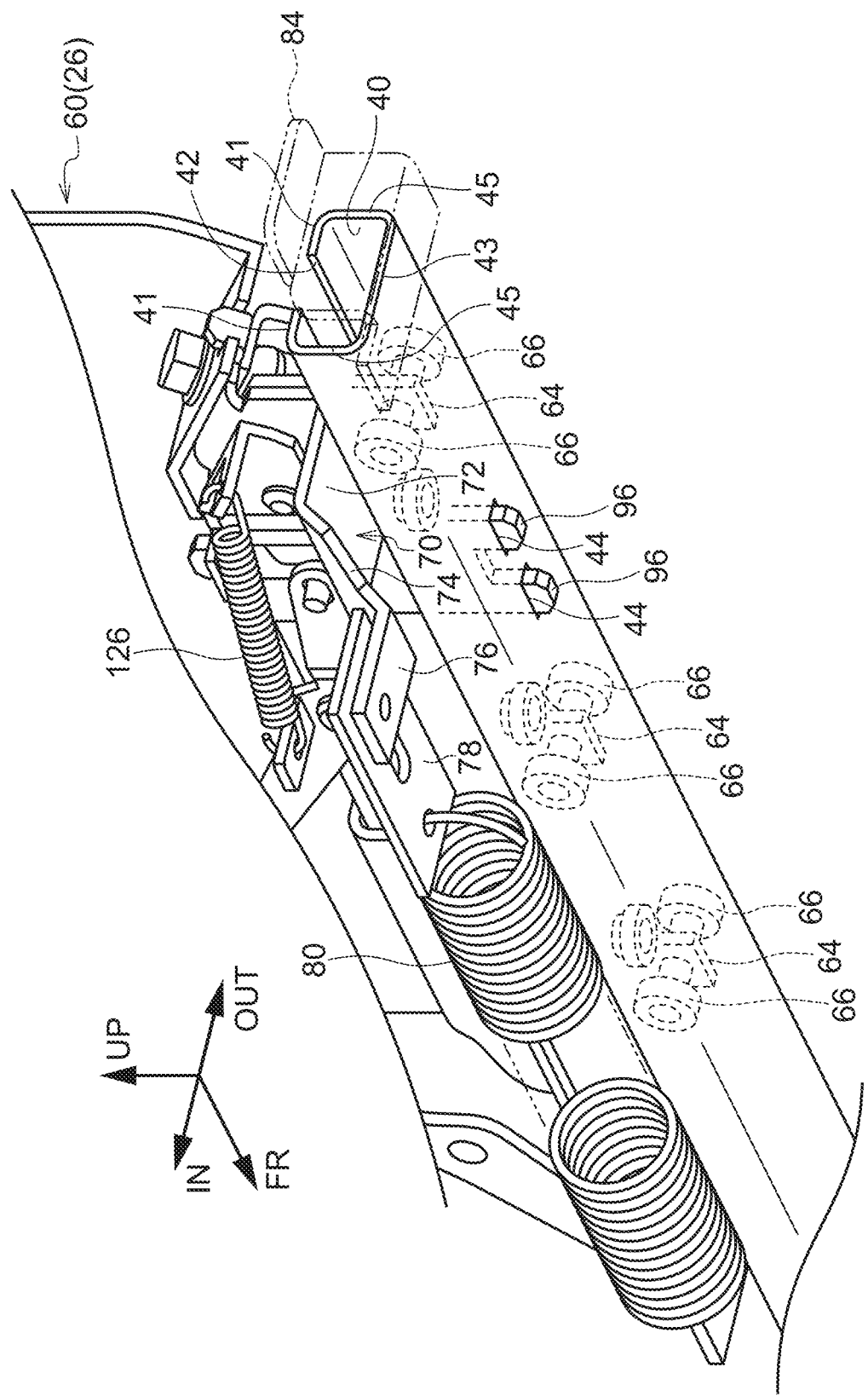
FIG. 3 is a perspective view of a lower slide rail and a lower slide according to an embodiment, as viewed obliquely from the lower side.

As illustrated in FIGS. 1 and 3, the lower slide rail 24 which is supported by the base 22 is provided with a through hole 40 which extends in the seat front-back direction and has a substantially rectangular cross section. An opening 42 which extends in the seat front-back direction is formed at a central part in the seat width direction of an upper wall 41 of the lower slide rail 24, and the through hole 40 communicates with the outside through the opening 42.

A pair of holes 44 into which leg parts 96 of a lower slide lock 90 to be described below are inserted is formed in a bottom wall 43 of the lower slide rail 24 (see FIG. 3).

(Release Bracket)

Figure 4:
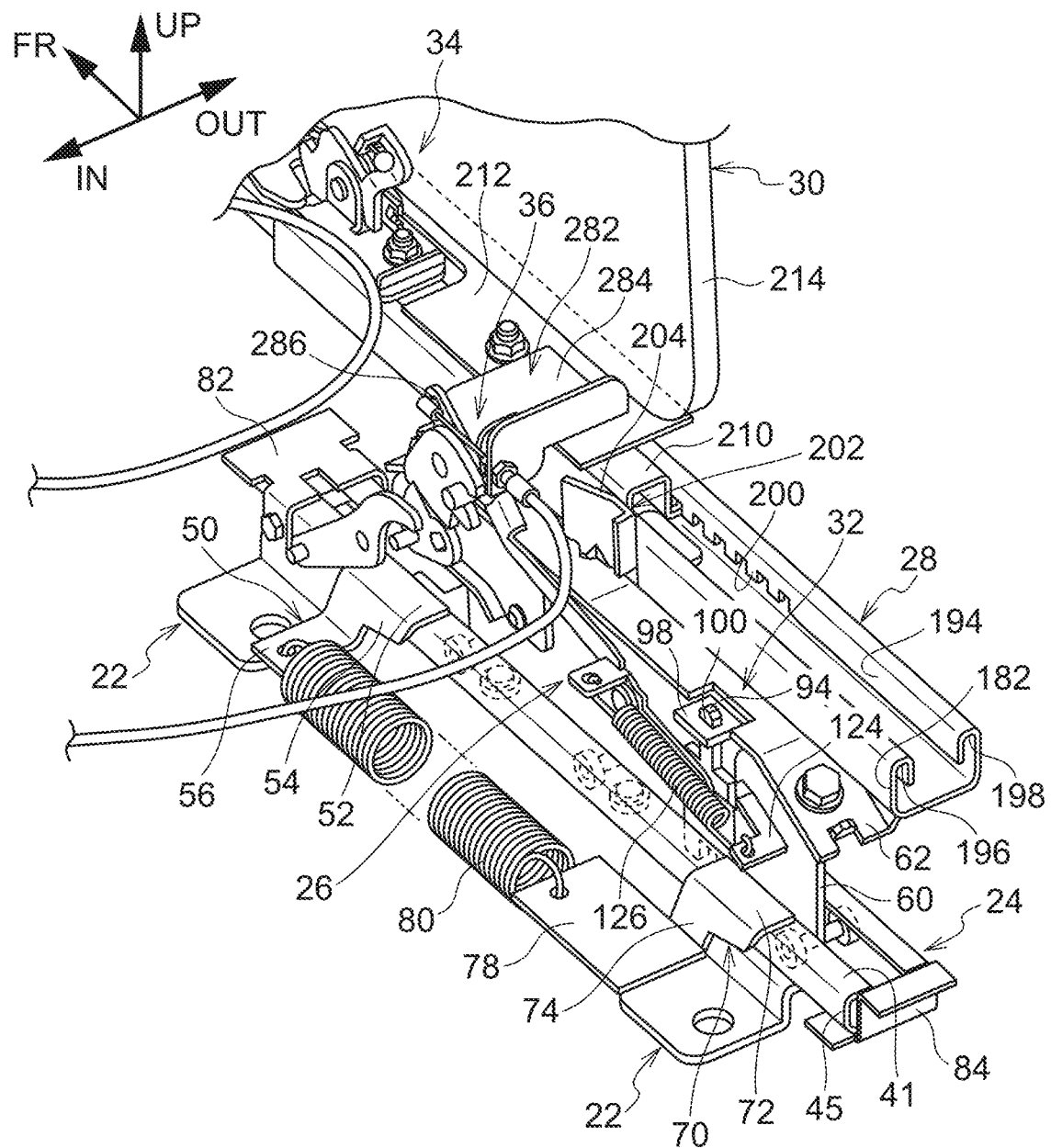
FIG. 4 is an enlarged perspective view of a main part of the seat slide mechanism according to an embodiment.

As illustrated in FIG. 4, a release bracket 50 for rotating an A-link 130 to be described below is attached to the seat front side of the upper wall 41 of the lower slide rail 24. The release bracket 50 includes an upper plate part 52 which is fixed onto the upper wall 41 of the lower slide rail 24, a vertical plate part 54 which extends toward a seat lower side from an inner end in the seat width direction of the upper plate part 52, and a lower plate part 56 which extends inward in the seat width direction from a lower end of the plate part 54.

When the lower slide 26 is located at the rear end position of the lower slide rail 24 (see FIG. 30), on the seat front side of the upper plate part 52, the vertical plate part 54, and the lower plate part 56, a clearance (recess) 58 is formed so as not to interfere with a pin 138 of the A-link 130 and the release bracket 50 (see FIG. 26).

(Lower Slide)

As illustrated in FIGS. 2 and 4, the lower slide 26 that slides in the seat front-back direction on the lower slide rail 24 includes a lower member 60 which is a substantially plate-like body extending in a seat vertical direction, and an upper member 62 which is fixed to an upper part of the lower member 60 and supports the upper slide rail 28.

As illustrated in FIG. 3, a plurality of plate members 64 is formed to protrude downward at predetermined intervals at a lower end of the lower member 60, and the plate member 64 is provided with a pair of rollers 66 which is rotatably supported. The plate member 64 of the lower member 60 is inserted into the through hole 40 from the opening 42 of the lower slide rail 24, and the pair of rollers 66 is disposed so as to be able to roll within the through hole 40. As a result, the lower slide 26 is movable in the seat front-back direction on the lower slide rail 24.

As illustrated in FIG. 4, a support member 70 is attached to the lower end at the seat rear end side of the lower member 60. The support member 70 includes an upper plate part 72 which extends inward in the seat width direction from the lower end of the lower member 60, a vertical plate part 74 which extends downward from an inner end in seat inward direction of the upper plate part 72, and a lower plate part 76 (see FIGS. 3 and 5) which extends inward in the seat width direction from the lower end of the vertical plate part 74. The upper plate part 72 is located at a location higher than the upper wall 41 of the lower slide rail 24. The vertical plate part 74 is located at the inner side of the side wall 45 of the lower slide rail 24 inward in the seat width direction. That is, the support member 70 does not interfere with the lower slide rail 24.

Figure 5:
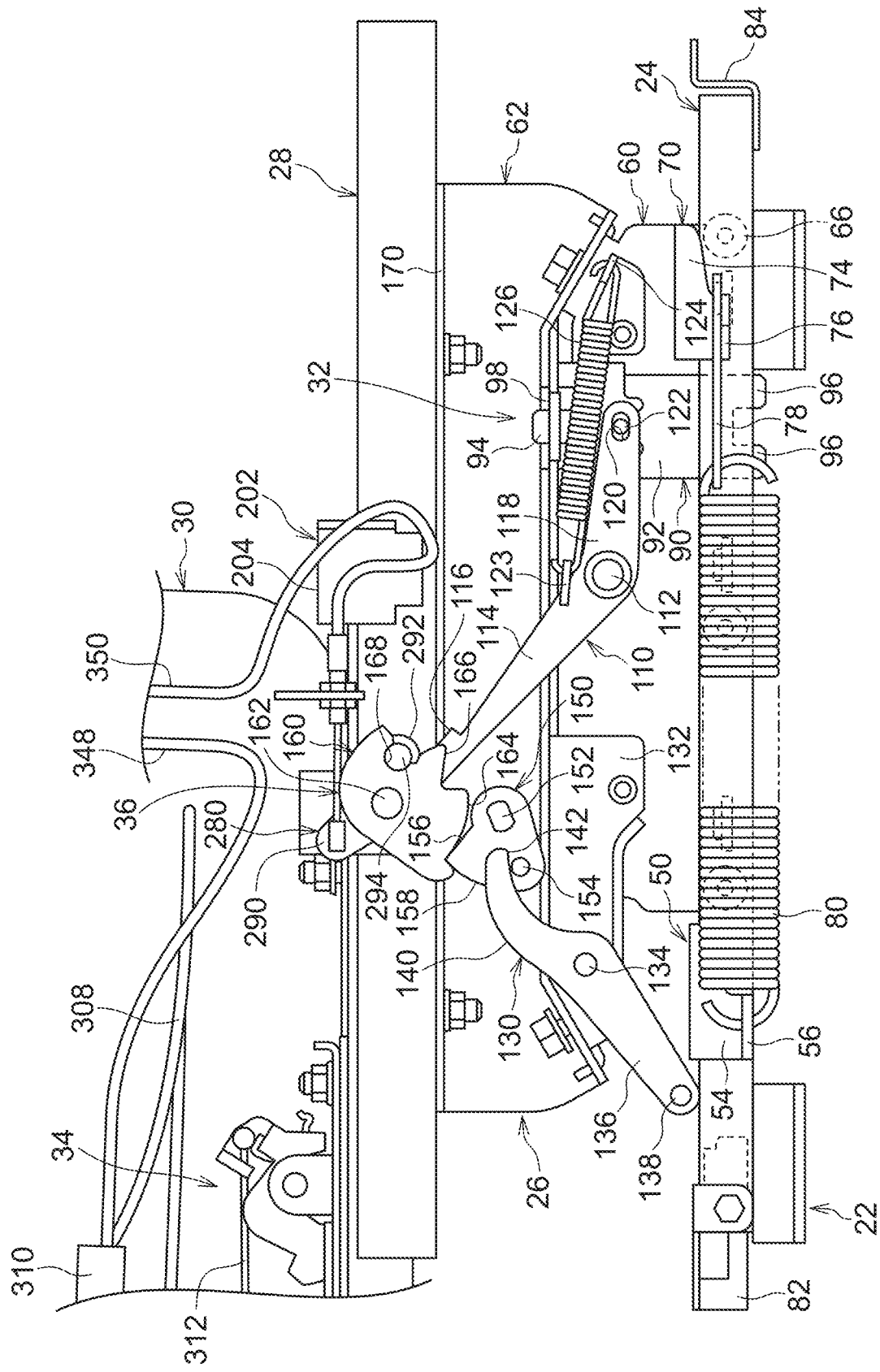
FIG. 5 is an enlarged side view of the main part of the seat slide mechanism according to an embodiment.

As illustrated in FIGS. 4 and 5, a mounting plate 78 extending toward the seat front side is mounted on the lower plate part 76. A W/I spring 80 is disposed between the mounting plate 78 and the lower plate part 56 of the release bracket 50. The seat front end of the W/I spring 80 engages with the lower plate part 56 of the release bracket 50, and the seat rear end of the W/I spring 80 engages with the mounting plate 78. Therefore, the lower slide 26 is constantly urged against the seat front side by an urging force of the W/I spring 80.

Stoppers 82 and 84 are disposed at both ends of the lower slide rail 24 and define a slide range (range from a tip end position to an overlap position) of the lower slide 26.

(Lower Slide Lock)

As illustrated in FIG. 5, the lower member 60 is provided with a lower slide lock 90 which fixes (locks) the lower slide 26 to the lower slide rail 24, or releases the fixation (locking).

As illustrated in FIG. 5, the lower slide lock 90 includes a body part 92 which is a substantially rectangular plate-like body, a head part 94 which is provided on the upper part of the body part 92 and is thinner than the body part 92, and a pair of leg parts 96 which is provided in the lower part of the body part 92. As illustrated in FIG. 4, the head part 94 is inserted into a hole 100 of an upper flange 98 of the lower member 60. As illustrated in FIG. 3, when the lower slide 26 is fixed, the leg parts 96 are inserted into the holes 44 of the lower slide rail 24, and when the fixation is released, the leg parts 96 contact the bottom wall 43 of the lower slide rail 24.

(Lower Slide Lever)

On the seat front side of the lower slide lock 90 in the lower member 60, as illustrated in FIG. 5, a lower slide lever 110 serving as a driving unit is rotatably supported around a rotation shaft 112. The lower slide lever 110 includes a first arm 114 which extends from the rotation shaft 112 toward the seat front side, and a second arm 118 which extends from the rotation shaft 112 toward the seat rear side, a contact surface 116 for contact against a pin 294 of an unlocking link 280 to be described below is formed at the tip end of the first arm 114. An elongated hole 120 whose longitudinal direction corresponds to the seat front-back direction is provided at the tip end of the second arm 118. A pin member 122 which is provided at the body part 92 of the lower slide lock 90 is inserted into the elongated hole 120. Therefore, the lower slide lock 90 with the head part 94 inserted in the hole 100 of the upper flange 98 of the lower member 60 is configured to move up and down by the rotation of the lower slide lever 110.

As illustrated in FIGS. 4 and 5, a coil spring 126 is disposed between an engagement plate 123, which is provided at the first arm 114 of the lower slide lever 110, and an engaging part 124 provided at the lower member 60. Therefore, the lower slide lever 110 is constantly urged clockwise in FIG. 5 by the urging force of the coil spring 126. As a result, the lower slide lock 90 is constantly urged downward.

(A-Link)

As illustrated in FIG. 5, an attachment member 132 is attached to the lower member 60 at the seat tip end side of the lower slide lever 110. The A-link 130 is attached to the attachment member 132 so as to be rotatable around a rotation shaft 134. The A-link 130 includes a first arm 136 which extends from the rotation shaft 134 toward the seat front side, and a second arm 140 which extends toward the seat rear side. The pin 138 penetrating both sides in the seat width direction is disposed at the tip of the first arm 136. The second arm 140 is curved upward in FIG. 5, and the tip end side of the lower side surface thereof becomes a contact surface 142 to be in contact with a pin 154 of a cam 150 to be described below.

(Cam)

In the upper member 62, as illustrated in FIG. 5, the cam 150 is attached to the seat upper side of the attachment member 132. The cam 150 is attached to a mounting member (not illustrated), which is attached to the upper member 62, so as to be rotatable around a rotation shaft 152. The cam 150 has a substantially fan shape, and the pin 154 protruding inward in the seat width direction is formed on the lower end side of the fan shape, and the cam 150 can come into contact with the contact surface 142 of the second arm 140 of the A-link 130. On the outer peripheral surface of the cam 150, a contact surface 156 corresponding to an upper radial surface of the fan shape, and a curved surface 158 corresponding to a circular arc part of the fan shape are formed.

(Lock)

Further, in the upper member 62, a lock 160 is disposed on the upper part of the cam 150. The lock 160 is disposed so as to be rotatable around a rotation shaft 162 with respect to a mounting member (not illustrated) attached to the upper member 62. As illustrated in FIG. 5, the lock 160 has a substantially quarter-circular shape. As illustrated in FIG. 24, an arcuate curved surface 164 is formed on the outer peripheral surface of the lock 160, and a stepped surface 174, an engaging surface 166, a guide surface 167, and a recess 168 are formed in a counterclockwise direction in FIG. 24 from the curved surface 164. A protrusion 172 is formed adjacent to the curved surface 164 in the clockwise direction on the outer peripheral surface of the lock 160. The recess 168 accommodates the pin 294 of the unlocking link 280 to be described below when the pin 294 is located at a lower position.

The engaging surface 166 is a surface which the contact surface 156 of the cam 150 contacts. In this case, the curved surface 158 of the cam 150 contacts the stepped surface 174. The guide surface 167 is a surface that guides the pin 294 of the unlocking link 280 to be described below to the recess 168. The protrusion 172 contacts the curved surface 158 of the cam 150, thereby regulating the range of rotation of the lock 160.

(Upper Slide Rail)

Figure 6:
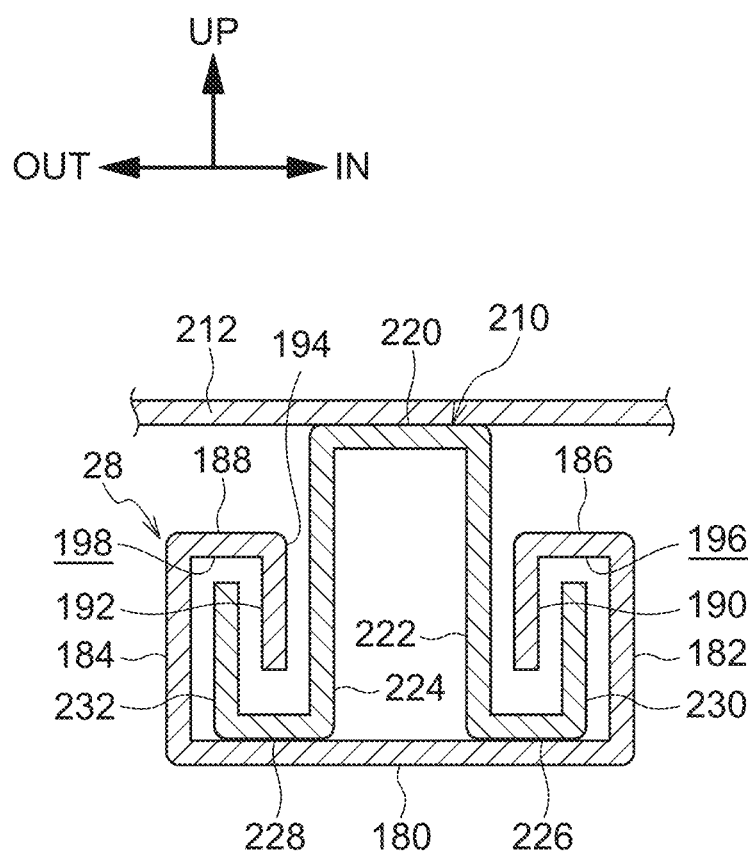
FIG. 6 is a cross-sectional view illustrating a relationship between an upper slide rail and a slider according to an embodiment.

As illustrated in FIG. 5, the upper slide rail 28 is fixed onto the upper surface 170 of the upper member 62 of the lower slide 26. As illustrated in FIG. 4, the upper slide rail 28 extends in the seat front-back direction. As illustrated in FIG. 6, the upper slide rail 28 includes a bottom wall 180 which extends in the seat width direction, vertical walls 182 and 184 which extend upward from both ends of the bottom wall 180 in the seat width direction, vertical upper walls 186 and 188 which extend from the upper ends of the walls 182 and 184 outward and inward, respectively, in the seat width direction, and engaging walls 190 and 192 which extend downward from the outer end in the seat width direction of the upper wall 186 and the inner end in the seat width direction of the upper wall 188, respectively.

That is, an opening 194 which is opened upward between the engaging walls 190 and 192 and extends in the seat front-back direction is formed. In addition, a groove 196 which is surrounded by the vertical wall 182, the upper wall 186, the engaging wall 190, and a groove 198 which is surrounded by the vertical wall 184, the upper wall 188, and the engaging wall 192 are formed.

On the engaging walls 190 and 192, engaging parts 200 (only the engaging parts 200 located near the engaging wall 192 are illustrated), which are convex parts formed at regular intervals over the length corresponding to the slide distance of the upper slide 30 to be described below are formed. The upper slide 30 and the upper slide rail 28 are fixed by inserting the engaging part 200 into a hole 238 of a lock plate 236 to be described below.

Further, a memory release bracket 202 for unlocking an unlocking cam 250 by rotating a memory cam 270 to be described below when the upper slide 30 slides is attached to the inner side in the seat width direction of the vertical wall 182 of the upper slide rail 28. The memory release bracket 202 includes a guide plate 204 that is tilted outward (vertical wall 182 side) in the seat width direction toward the seat rear side in plan view. As illustrated in FIG. 5, the guide plate 204 protrudes upward from the upper slide rail 28 (the upper wall 186), and when the upper slide 30 slides to the seat rear side during a walk-in return operation to be described below, the guide plate 204 can come into contact with the memory cam 270.

(Upper Slide)

As illustrated in FIGS. 1 and 2, the upper slide 30 includes a slider 210 which is slidably formed in the upper slide rail 28, a flat plate 212 which has a substantially rectangular shape and is slidably formed on the upper part of the upper slide rail 28, and a vertical plate 214 which is erected on the outer end in the seat width direction of the flat plate 212.

As illustrated in FIG. 6, the slider 210 includes an upper wall 220 which extends in the seat width direction, vertical walls 222 and 224 which extend toward the seat lower side from both ends in the seat width direction of the upper wall 220, lower walls 226 and 228 which extend inward and outward in the seat width direction from lower ends of the vertical walls 222 and 224, respectively, and vertical walls 230 and 232 which extend toward the seat upper side from the inner end in the seat width direction of the lower wall 226 and the outer end in the seat width direction of the lower wall 228, respectively.

By placing the lower walls 226 and 228 of the slider 210 on the bottom wall 180 of the upper slide rail 28, the upper wall 220 of the slider 210 protrudes to the outside from the opening 194, and the vertical walls 230 and 232 are respectively disposed in the grooves 196 and 198 of the upper slide rail 28. As a result, the slider 210 is configured to be guided in the upper slide rail 28 and be slidable in the seat front-back direction.

Figure 7:
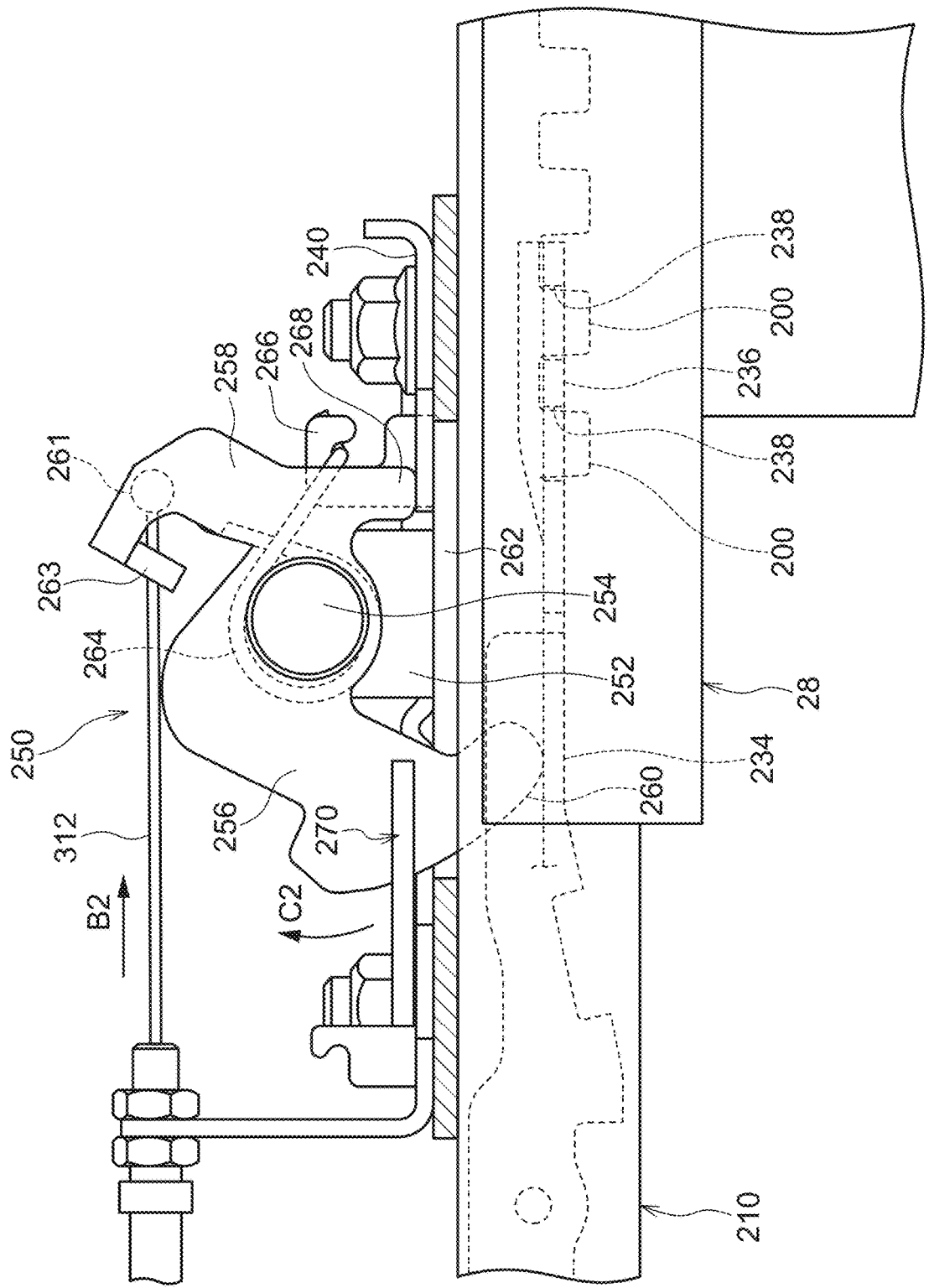
FIG. 7 is a side view illustrating a locked state of an upper lock mechanism according to an embodiment.
Figure 8:
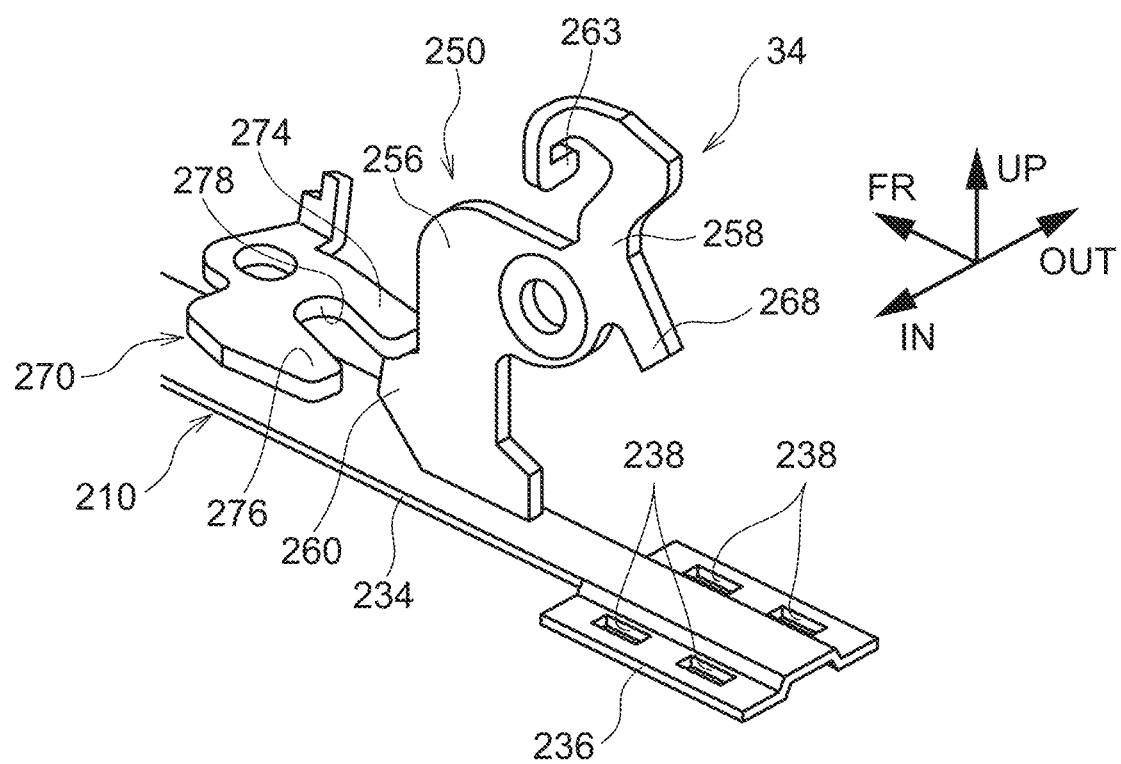
FIG. 8 is a perspective view of the main part illustrating an unlock maintaining state of the upper lock mechanism according to an embodiment.

As illustrated in FIGS. 7 and 8, a deformable part 234 serving as a first engaging part having flexibility, and a lock plate 236 which is provided at the tip end of the deformable part 234 are formed at the center of the slider 210 in the front-rear direction.

Two holes 238 each having a rectangular shape in a plan view are formed at regular intervals on each of the both ends of the lock plate 236 in the seat width direction.

The deformable part 234 is located between the engaging walls 190 and 192 of the upper slide rail 28, and the lock plate 236, which is provided at the tip end of the deformable part 234, has a wider width in the seat width direction than the deformable part 234 and the hole 238 is located below the engaging part 200 of the engaging walls 190 and 192.

Figure 9:
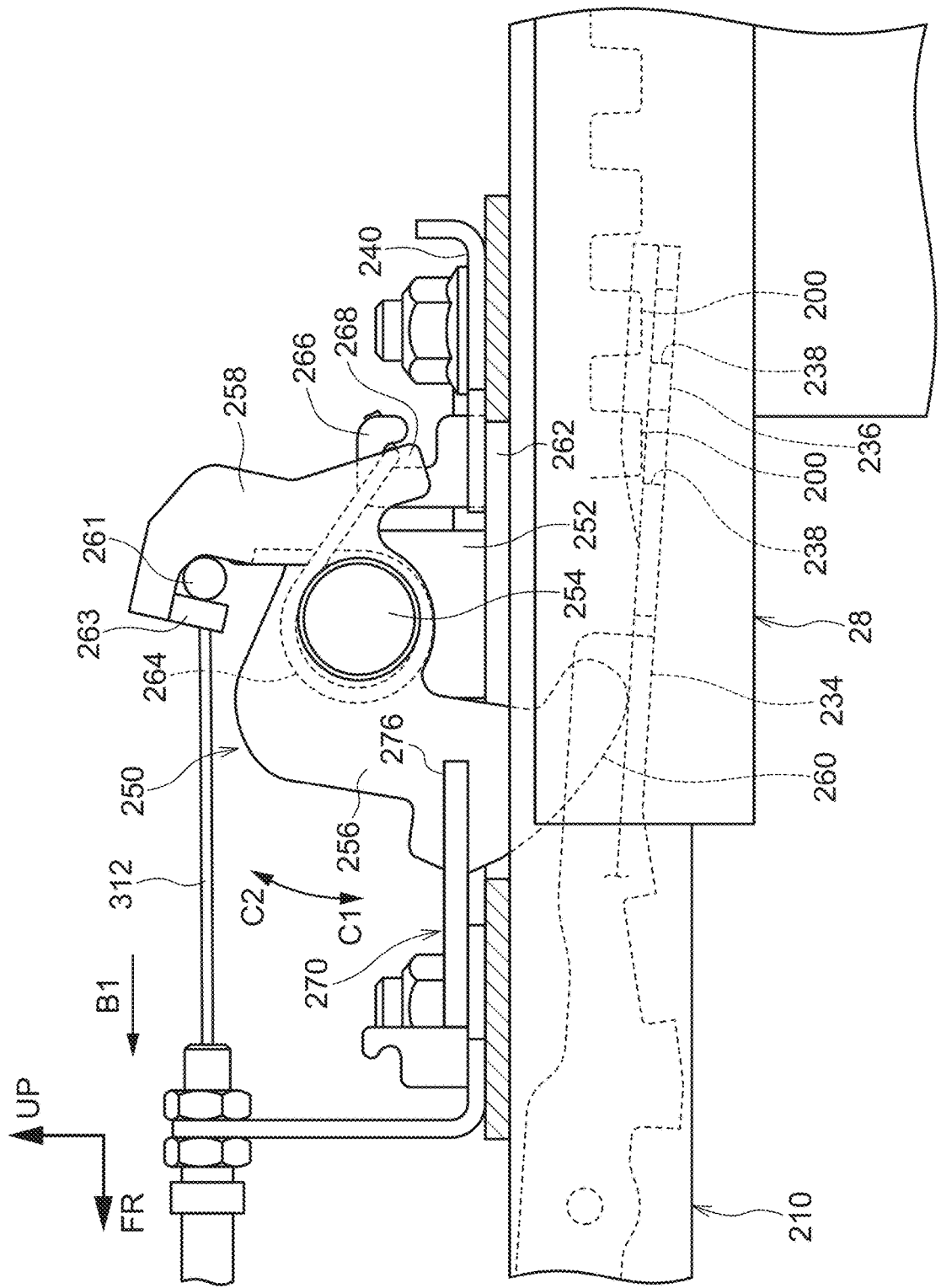
FIG. 9 is a side view illustrating an unlocked state of the upper lock mechanism according to an embodiment.
Figure 10:
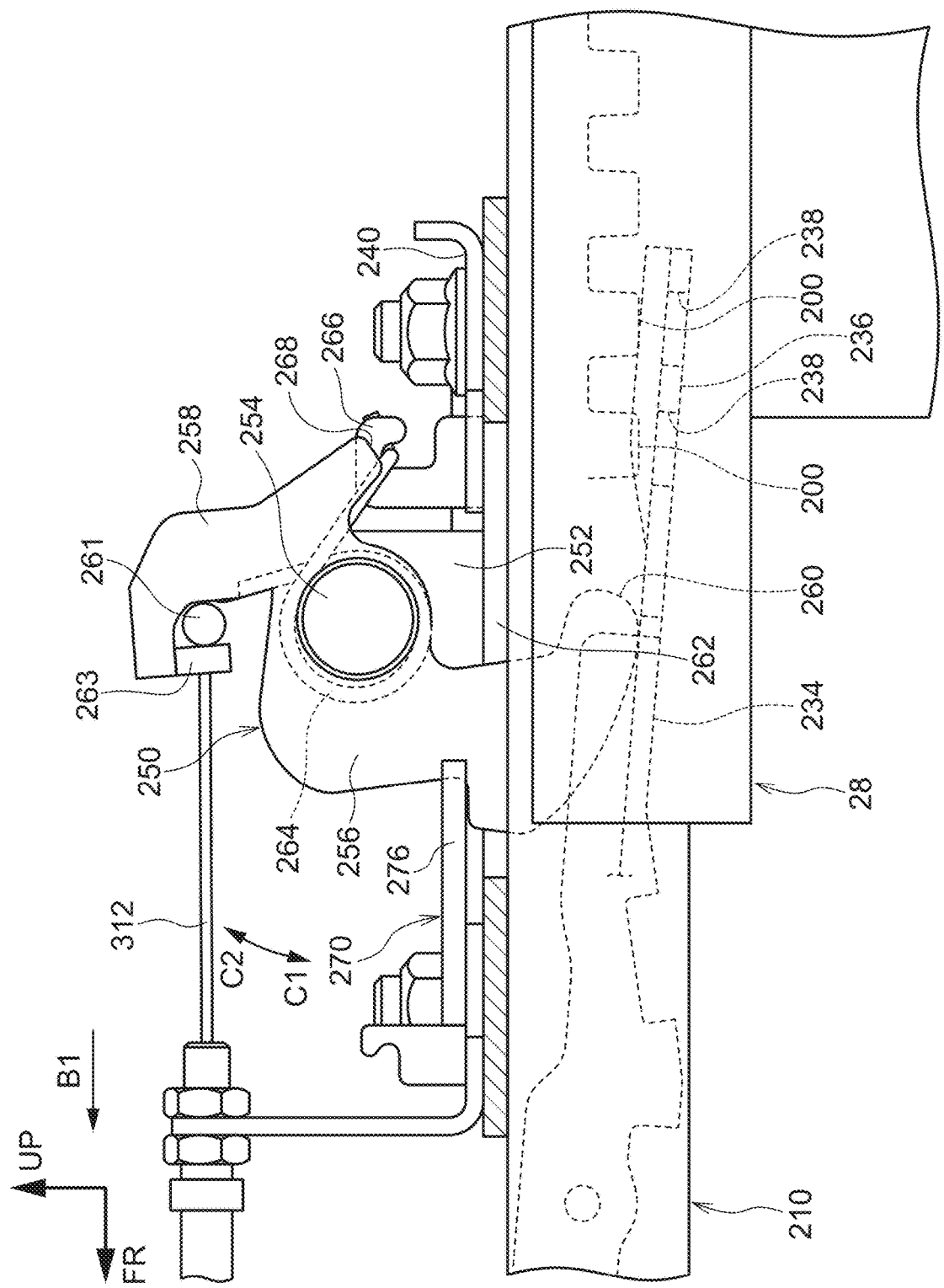
FIG. 10 is a side view illustrating the unlock maintaining state of the upper lock mechanism according to an embodiment.

Therefore, as illustrated in FIG. 7, the slider 210, that is, the upper slide 30 is generally fixed to the upper slide rail 28 by inserting the engaging part 200 into the hole 238 of the lock plate 236. On the other hand, as illustrated in FIG. 9 or FIG. 10, when the deformable part 234 is pushed down by a claw part 260 of the unlocking cam 250 to be described below, the engaging part 200 is detached from the hole 238 of the lock plate 236 and the slider 210, that is, the upper slide 30 is configured to be slidable with respect to the upper slide rail 28.

In the slider 210, the upper wall 220, the vertical walls 222 and 224, and the vertical walls 230 and 232 are not formed (cut out) in the part where the deformable part 234 and the lock plate 236 are formed, and the front part and the rear part are connected simply by the lower walls 226 and 228.

(Unlocking Cam)

Further, as illustrated in FIG. 11, a plate 240 is fixed onto the upper wall 220 of the slider 210 at the upper portion of the part of the slider 210. On the plate 240, the unlocking cam 250 serving as an urging unit for pushing down the deformable part 234 (unlocking the upper slide 30) is provided.

As illustrated in FIGS. 7 and 11, the unlocking cam 250 includes a first arm 256 which extends toward seat front side from a rotation shaft 254 which is supported by a pivot support part 252 erected on the plate 240, and a second arm 258 which extends toward the seat rear side. As illustrated in FIG. 7, the first arm 256 has a claw part 260 which protrudes in the counterclockwise direction at the radially outer end. The claw part 260 is inserted into a hole 262, which is formed below the claw part 260, and into the opening 194 of the upper slide rail 28 in the plate 240, and the tip end of the claw part 260 contacts the deformable part 234 of the slider 210.

An engaging part 263 for engaging with a spherical body 261, which is provided at an end of a third wire 312 serving as an urging unit to be described below, is provided at the radially outer end of the second arm 258. A hole is formed in the engaging part 263 so that the third wire 312 can be inserted therethrough but cannot pass through the spherical body 261. When the third wire 312 is pulled, the spherical body 261 engages with the engaging part 263, thereby applying a counterclockwise moment to the unlocking cam 250 in FIG. 7.

The unlocking cam 250 is provided with a contact part 268 which extends downward from the radially inner end of the second arm 258. The contact part 268 contacts the plate 240, thereby regulating the rotation range of the unlocking cam 250.

On the other hand, a spring 264 is wound around one end side of the rotation shaft 254 of the unlocking cam 250, one end of the spring 264 engages with an engaging part 266, which is provided at the plate 240, and the other end of the spring 264 engages with the second arm 258. That is, the unlocking cam 250 is constantly urged in the clockwise direction (a direction indicated by an arrow C2 in FIG. 7) around the rotation shaft 254 by the spring 264, as illustrated in FIG. 7.

When the third wire 312 is pulled, the spherical body 261 contacts the engaging part 263 and a counterclockwise moment is applied to the unlocking cam 250 through the second arm 258, so that the claw part 260 pushes down the deformable part 234 against the urging force of the spring 264. As a result, as illustrated in FIG. 9, the lock plate 236 provided at the tip end of the deformable part 234 is pushed down so that the engaging part 200 of the upper slide rail 28 comes out of the hole 238. That is, by pulling the third wire 312, the unlocking cam 250 can be rotated counterclockwise in FIG. 7 to release the locked state of the upper slide 30.

(Memory Cam)

As illustrated in FIG. 11, in the plate 240, the memory cam 270 is provided at the seat front side of the unlocking cam 250. As illustrated in FIGS. 11 and 20, the memory cam 270 is rotatable around a rotation shaft 272 in plan view. Further, the memory cam 270 is constantly urged by an urging unit (not illustrated) in a clockwise direction in plan view. The memory cam 270 includes claw parts 274 and 276 which extend substantially in parallel at the radially outside, and a recess 278 which is recessed radially inward is formed between the claw parts 274 and 276.

Normally, the claw part 260 of the unlocking cam 250 is located in the recess 278 of the memory cam 270, and the rotation of the memory cam 270 urged in the clockwise direction in plan view is hindered. On the other hand, when the claw part 260 of the unlocking cam 250 completely moves below the recess 278 of the memory cam 270, the urged memory cam 270 rotates and the claw part 274 of the memory cam 270 is located at an upper part of the claw part 260 of the unlocking cam 250, thereby preventing the unlocking cam 250 from returning to its original position (maintains the locked state of the upper slide 30) (see FIGS. 10 and 20).

(Unlocking Link)

Figure 12:
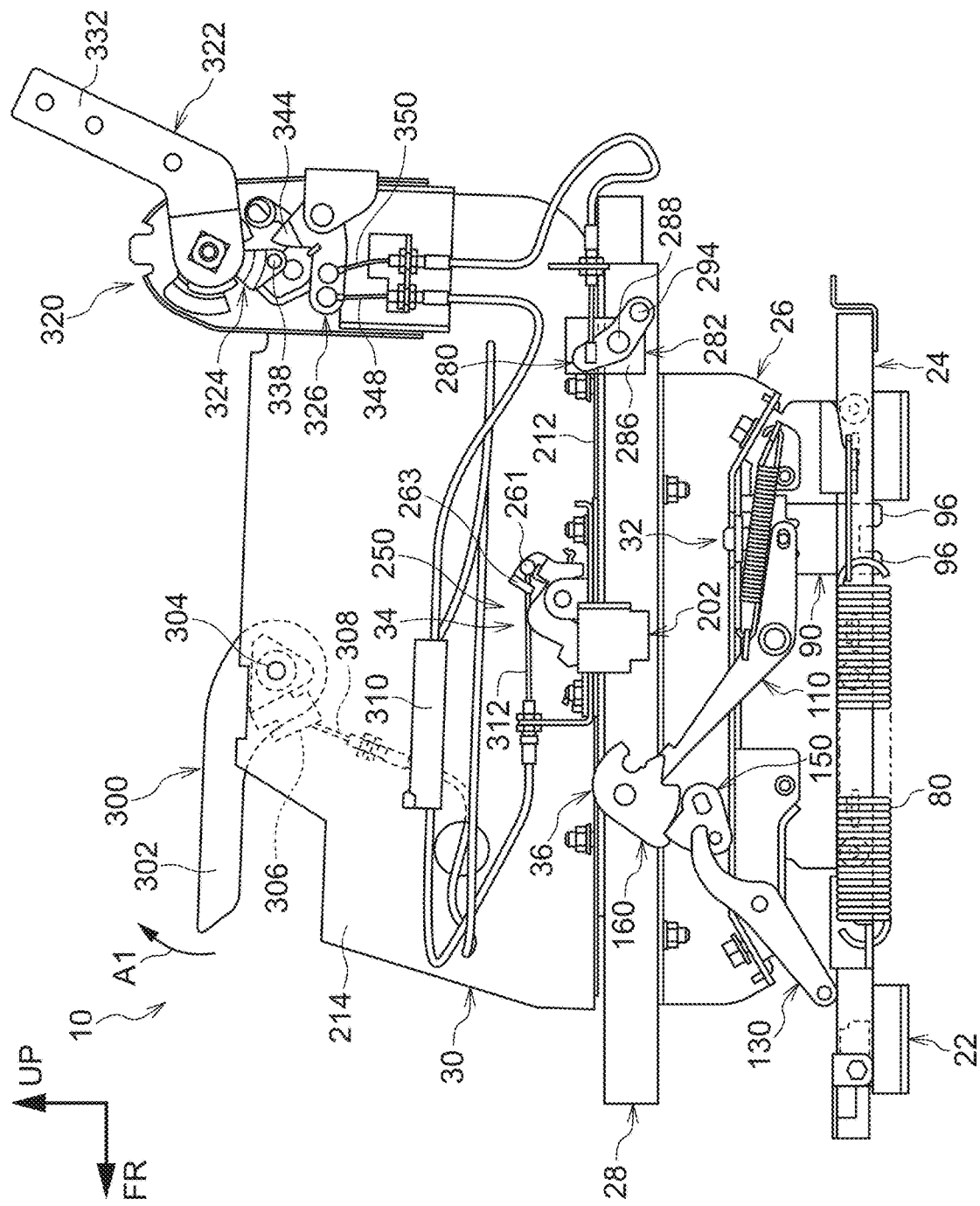
FIG. 12 is a side view illustrating a start state of the seat slide mechanism according to an embodiment during a walk-in operation.
Figure 14:
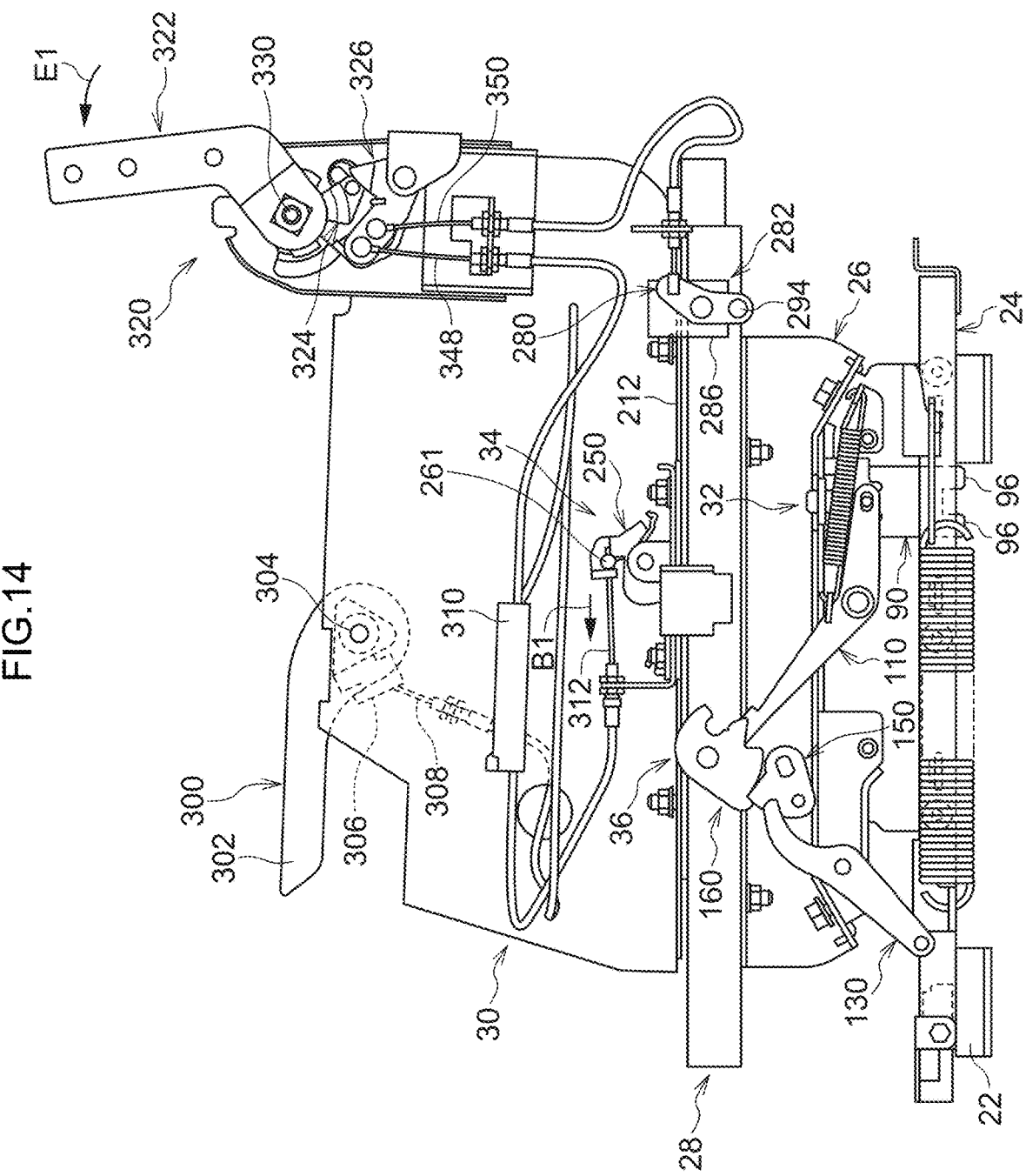

As illustrated in FIGS. 12 and 14, a support member 282 having a substantially L-shape as viewed along the seat front-back direction is attached to the seat rear end side (near the rear end side) of the flat plate 212 of the upper slide 30.

As illustrated in FIGS. 1 and 4, the support member 282 includes a flat plate part 284 which extends from the upper part of the flat plate 212 to the inner side in the seat width direction than the inside of the upper slide rail 28 in the seat width direction, and a vertical wall part 286 which extends downward from the seat inner end of the flat plate part 284.

As illustrated in FIG. 12, an unlocking link 280 is attached to the vertical wall part 286 through a rotation shaft 288. Therefore, when the upper slide 30 moves in the seat front-back direction on the upper slide rail 28, the memory release bracket 202 is prevented from interfering with the unlocking link 280.

Figure 13:
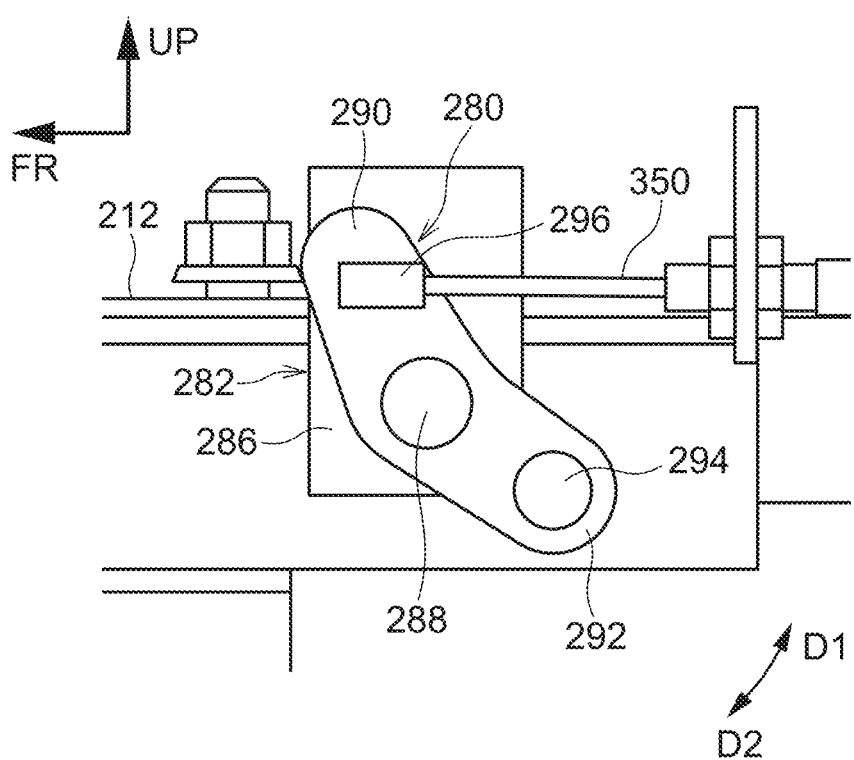
FIG. 13 is a side view illustrating a start state of an unlocking link according to an embodiment during the walk-in operation.

As illustrated in FIG. 13, the unlocking link 280 includes a first arm 290 which extends upward from the rotation shaft 288, and a second arm 292 which extends toward the seat lower side. The first arm 290 and the second arm 292 are arranged in substantially a V-shape as viewed along the seat width direction. The unlocking link 280 is constantly urged counterclockwise (in a direction indicated by an arrow D1) in FIG. 13 by an urging unit (not illustrated).

An engaging part 296 is provided at the radial end side of the first arm 290, and one end of a fourth wire 350 serving as a driving unit to be described below engages with the engaging part 296. The unlocking link 280 is configured to rotate clockwise (in a direction indicated by an arrow D2) in FIG. 13 against the urging force by pulling the fourth wire 350.

The pin 294 penetrating both sides in the seat width direction is provided at the radial end side of the second arm 292. When the upper slide 30 is located at the tip end position of the upper slide rail 28, the inner side part of the pin 294 in the seat width direction (hereinafter also referred to as "inner part of the pin 294") can be fit into the recess 168 of the lock 160, and the outer side part of the pin 294 in the seat width direction (hereinafter also referred to as "outer part of the pin 294") can come into contact with the contact surface 116 of the lower slide lever 110.

(Upper Slide Lever)

As illustrated in FIG. 12, an upper slide lever 300 is provided at the seat front side of the vertical plate 214 of the upper slide 30. The upper slide lever 300 is provided on the outside in the seat width direction of the vertical plate 214. An occupant gripping and operating a handle part 302, which extends radially outward, to rotate the upper slide lever 300 clockwise or counterclockwise around the rotation shaft 304 as illustrated in FIGS. 12 and 14, thereby rotating the unlocking cam 250 to release the locked state of the upper slide 30 with respect to the upper slide rail 28, or return to the locked state.

An engaging part 306 is provided at the rotation shaft 304 of the upper slide lever 300, and one end of the first wire 308 is fixed. The first wire 308 is coupled to the third wire 312 through a merging part 310 and the spherical body 261 located at the end of the third wire 312 engages with the engaging part 263 of the unlocking cam 250.

Accordingly, as illustrated in FIG. 16, when the upper slide lever 300 is rotated in the clockwise direction (a direction indicated by an arrow A1) in FIG. 16, the first wire 308 and, through the merging part 310, the third wire 312 are pulled leftward (in a direction indicated by an arrow B1) in FIG. 16, and the unlocking cam 250 is rotated counterclockwise (in a direction indicated by an arrow C1) against the urging force of the spring 264, thereby pushing down (elastically deforming) the deformable part 234. That is, the engaging part 200 is detached from the hole 238 of the lock plate 236, and the upper slide 30 is slidable (unlocked) on the upper slide rail 28.

However, the rotation amount of the upper slide lever 300 is regulated, and the claw part 260 of the unlocking cam 250 is prevented from rotating completely from the inside of the recess 278 of the memory cam 270 (prevented from fixing the unlocked state) by the rotation of the upper slide lever 300.

(Recliner Operation Mechanism)

As illustrated in FIGS. 1 and 2, a recliner operation mechanism 320 is provided on the upper part on the seat rear side of the vertical plate 214 of the upper slide 30. As illustrated in FIG. 15, the recliner operation mechanism 320 includes a recliner 322 which is provided at the lower end of the seat back 16 and rotates together with the seat back 16, a transmission member 324 which rotates integrally with the recliner 322, a second wire 348 serving as an urging unit to be described below, a cable operation member 326 to which an end of the fourth wire 350 to be described below is attached and which rotates against the urging force by the rotation of the transmission member 324, and an mounting plate 328 to which the recliner 322, the transmission member 324, the cable operation member 326 are attached.

The recliner 322 that is attached rotatably around a reclining shaft 330, which is located at a lower end of the seat back 16, is attached to the upper part of the mounting plate 328. The recliner 322 includes a shaft part 334 which is attached to the reclining shaft 330, and an extending part 332 which is formed along the extending direction of the seat back 16 from the shaft part 334.

On the reclining shaft 330, the transmission member 324 is disposed on the outside in the seat width direction (the side of the mounting plate 328) of the recliner 322 (shaft part 334). The transmission member 324 includes an arm part 336 which extends downward from the reclining shaft 330 to the outside in the radial direction of the shaft part 334 of the recliner 322, and a pin 338 which is formed to protrude inward in the seat width direction at the lower end of the arm part 336.

The cable operation member 326 is rotatably attached to the bracket 340, which is attached to the mounting plate 328, through a rotation shaft 342. The cable operation member 326 includes a contact part 344 which extends from the rotation shaft 342 to the seat upper side, and a cable mounting part 346 which extends from the rotation shaft 342 substantially to the seat front side.

As illustrated in FIG. 15, the cable operation member 326 is constantly urged in the counterclockwise direction (a direction indicated by an arrow G2) by an urging unit (not illustrated) in FIG. 15, and the contact part 344 constantly contacts the pin 338 of the transmission member 324.

One end of the second wire 348 and one end of the fourth wire 350 engage with the cable mounting part 346 by the engaging parts 352 and 354, respectively. Accordingly, when the cable operation member 326 rotates in the clockwise direction (a direction indicated by an arrow G1) or in the counterclockwise direction (a direction indicated by an arrow G2), the second wire 348 and the fourth wire 350 are pulled upward (see FIG. 19), or are loosened (see FIG. 18).

The other end of the second wire 348 is connected to the merging part 310 as illustrated in FIG. 12. Accordingly, the pulling and loosening of the second wire 348 is transmitted to the third wire 312 through the merging part 310. When a tensile force acts on one of the first wire 308 and the second wire 348, the merging part 310 transmits the tensile force to the third wire 312, and when no tensile force acts on the first wire 308 and the second wire 348, no tensile force is applied to the third wire 312 (the third wire 312 is loosened).

The pulling amount of the third wire 312 due to the rotation of the cable operation member 326 (the recliner 322) is larger than the pulling amount of the third wire 312 due to the operation (rotation) of the upper slide lever 300. The claw part 260 of the unlocking cam 250 passes through the recess 278 of the memory cam 270 by pulling of the third wire 312 due to the rotation of the cable operation member 326, and the memory cam 270 rotates so that the claw part 274 is located at the upper part of the claw part 260, thereby preventing the unlocking cam 250 from returning. That is, the unlocked state can be maintained.

On the other hand, since the other end of the fourth wire 350 engages with the first arm 290 of the unlocking link 280 by the engaging part 296, by pulling the fourth wire 350, the unlocking link 280 rotates clockwise (in the direction indicated by the arrow D2) in FIG. 13, and the pin 294 of the second arm 292 moves toward the seat lower side.

In the embodiment, the lower lock mechanism 32 includes the lower slide rail 24 (holes 44), the lower slide lock 90, the lower slide lever 110, the lock 160, the cam 150, the A-link 130, the release bracket 50, the unlocking link 280, the fourth wire 350, and the recliner operation mechanism 320.

Further, in the embodiment, the upper lock mechanism 34 includes the upper slide rail 28, the unlocking cam 250, the third wire 312, the merging part 310, the second wire 348, and the recliner operation mechanism 320.

Further, in the present embodiment, the vertical slide lock mechanism 36 includes a release bracket 50, an A-link 130, a cam 150, a lock 160, an unlocking link 280, a fourth wire 350, and a recliner operation mechanism 320.

In addition, the pin 294 corresponds to a pin, the lock 160 corresponds to an engaging member, and the recess 168 corresponds to a recess, and the release bracket 50, the link 130, and the cam 150 correspond to an engagement release mechanism. Further, the engaging part 200 of the upper slide rail 28 corresponds to a first engaged part, the deformable part 234 of the slider 210 and the lock plate 236 correspond to a first engaging part. Each hole 44 of the lower slide rail 24 corresponds to a second engaged part, and the lower slide lock 90 corresponds to a second engaging part. Further, the memory cam 270 corresponds to an engagement release state maintaining unit. The unlocking cam 250, the third wire 312, the second wire 348, and the recliner operation mechanism 320 correspond to an urging unit. Further, the lower slide lever 110, the unlocking link 280, the fourth wire 350, and the recliner operation mechanism 320 correspond to a driving unit. The upper slide lever 300 corresponds to an operation lever.

[Description of Operation]

The operation of the seat slide mechanism 10 according to the embodiment will be described. First, a normal seat position adjustment will be described, then an operation for moving a vehicle seat in a front row forward when an occupant seated in a rear-row seat gets on or off (hereinafter referred to as "walk-in operation") will be described, and lastly, an operation for returning from the walk-in operation (hereinafter referred to as "walk-in return operation") will be described.

(During Normal Seat Position Adjustment)

First, as illustrated in FIG. 16, the handle part 302 of the upper slide lever 300 is grasped and rotated in the clockwise direction (the direction indicated by the arrow A1) against the urging force of the spring. As a result, the first wire 308 is pulled upward, and this tensile force is transmitted to the third wire 312 through the merging part 310. Therefore, the third wire 312 moves leftward in the figure (in the direction indicated by the arrow B1), and the spherical body 261 provided at the end of the third wire 312 contacts the engaging part 263 of the unlocking cam 250. As a result, a moment is applied to the unlocking cam 250 in the counterclockwise direction (the direction indicated by the arrow C1) in the figure.

As illustrated in FIG. 16, the unlocking cam 250 rotates in the direction indicated by the arrow C1 (counterclockwise in FIG. 16) against the urging force by the spring 264, and pushes down the deformable part 234 of the slider 210 (to the state illustrated in FIGS. 7 to 9). As a result, the engaging part 200 of the upper slide rail 28 is detached from the hole 238 of the lock plate 236. That is, the upper slide 30 is released from the locked state with respect to the upper slide rail 28.

As illustrated in FIG. 9, the rotation amount of the unlocking cam 250 by the operation of the upper slide lever 300 is not large enough for the claw part 260 to completely pass through the recess 278 of the memory cam 270, so that the claw part 260 of the unlocking cam 250 stops in the recess 278 and the rotation of the memory cam 270 is hindered.

In this state, the upper slide 30 is caused to slide on the upper slide rail 28 by pushing the vehicle seat to the seat front side or the seat rear side, thereby allowing the vehicle seat 12 to move to a desired position. Thus, the operation of the upper slide lever 300 is terminated (the handle part 302 is released). As a result, the upper slide lever 300 which is urged by a spring (not illustrated) rotates counterclockwise in FIG. 16 (in a direction indicated by an arrow A2) and returns to its original position (see FIG. 2). Thus, the first wire 308, the end of which engages with the engaging part 306 of the upper slide lever 300, moves downward, and the spherical body 261 which is provided at the end of the third wire 312 connected to the first wire 308 through the merging part 310 moves rightward (in a direction indicated by an arrow B2) in the figure (see FIG. 2). As a result, the moment acting on the engaging part 263 of the unlocking cam 250 from the spherical body 261 provided at the end of the third wire 312 also disappears.

Accordingly, the unlocking cam 250 rotates clockwise (in the direction of the arrow C2 in FIG. 9) until the contact part 268 contacts the plate 240 by the urging force of the spring 264. As a result, as illustrated in FIG. 7, the deformable part 234 which is deformed below the slider 210 returns to its original position and the engaging part 200 of the upper slide rail 28 is inserted into the hole 238 of the lock plate 236. In this manner, the vehicle seat 12 can be moved to an arbitrary position and locked only by operating the upper slide lever 300 and moving the vehicle seat 12 back and forth.

In this case, since the lower slide 26 is locked to the lower slide rail 24 by the lower lock mechanism 32, the lower slide 26 does not move. Even when the upper slide 30 is located at the tip end position on the upper slide rail 28 by the operation of the upper slide lever 300, the pin 294 of the unlocking link 280 is located at the upper position (see FIG. 13), so that the vertical slide lock mechanism 36 is not fit into the recess 168 of the lock 160 (see FIG. 16) and thus the movement of the upper slide 30 is not regulated by the lower slide 26.

(During Walk-in Operation)

Next, the walk-in operation will be described.

First, an initial state before the operation (see FIG. 17A) will be described. FIG. 17 schematically illustrates the walk-in operation.

In this state, as illustrated in FIG. 12, the lower slide 26 is located at the rear end position of the lower slide rail 24. In this case, the lower slide 26 is locked to the lower slide rail 24 by the lower lock mechanism 32 (see FIGS. 3 and 5). The upper slide 30 is located at the rear end position of the upper slide rail 28. In this case, the upper slide 30 is locked to the upper slide rail 28 by the upper lock mechanism 34 (see FIG. 7).

Further, as illustrated in FIG. 17A, the seat back 16 is tilted backward. In this case, as illustrated in FIG. 18, the pin 338 of the transmission member 324 which rotates together with the recliner 322 is separated apart from the contact part 344 of the cable operation member 326. Therefore, the cable operation member 326 is located at the original position by the urging force in the counterclockwise direction (see the direction indicated by the arrow G2 in FIG. 18).

Therefore, as illustrated in FIG. 18, no tensile force toward the seat upper side acts on the second wire 348 and the fourth wire 350 whose ends are fixed to the cable mounting part 346 of the cable operation member 326.

The upper slide lever 300 is also not operated and no tensile force toward the upper side of the seat acts on the first wire 308.

Therefore, no tensile force acts on the third wire 312 connected to the first wire 308 and the second wire 348 by the merging part 310, and no moment acts on the engaging part 263 of the unlocking cam 250 from the spherical body 261 provided at the end of the third wire 312. As a result, the unlocking cam 250 (claw part 260) is located above the seat by the urging force of the spring 264. As a result, as illustrated in FIG. 7, the deformable part 234 of the slider 210 is located at the original position, and the engaging part 200 of the upper slide rail 28 is inserted into the hole 238 of the lock plate 236. That is, the upper slide 30 is locked to the upper slide rail 28.

As illustrated in FIG. 13, no tensile force acts on the fourth wire 350. Accordingly, the unlocking link 280 urged in the counterclockwise direction in the figure (the direction indicated by the arrow D1) around the rotation shaft 288 is located at the original position and the pin 294 is located at a first position relatively above the seat.

For this initial state, the occupant operates the lever 20 provided on the seat back 16 (see FIGS. 17A and 17B), thereby raising the seat cushion 14 and tilting the seat back 16 forward.

As a result of the forward tilting of the seat back 16, as illustrated in FIGS. 14 and 19, the recliner 322 disposed along the extending direction of the seat back 16 rotates counterclockwise (in a direction indicated by an arrow E1) around the reclining shaft 330. As a result, the pin 338 of the transmission member 324 that rotates together with the recliner 322 contacts and pushes the contact part 344 of the cable operation member 326. As a result, the cable operation member 326 rotates in the clockwise direction (direction indicated by the arrow G1) in the figure against the urging force and the second wire 348 and the fourth wire 350, the ends of which are attached to the cable mounting part 346, are pulled upward.

As a result, as illustrated in FIG. 14, a tensile force acts on the third wire 312 through the second wire 348 and the merging part 310, and the spherical body 261 provided at the end of the third wire 312 moves leftward (in the direction indicated by the arrow B1) by an amount corresponding to the pulling amount of the second wire 348. That is, the spherical body 261 contacts and pushes the engaging part 263 of the unlocking cam 250 leftward in the figure. As a result, as illustrated in FIG. 10, the unlocking cam 250 rotates in the counterclockwise direction (the direction indicated by the arrow C1) around the rotation shaft 254 in the figure, and pushes the deformable part 234 of the slider 210 downward, thereby causing the engaging part 200 of the upper slide rail 28 to be detached from the hole 238 of the lock plate 236. That is, the locked state of the upper slide 30 with respect to the upper slide rail 28 is canceled.

In this case, as illustrated in FIG. 10, the claw part 260 of the unlocking cam 250 completely moves below the recess 278 of the memory cam 270. Therefore, as illustrated in FIG. 20, since the claw part 260 of the unlocking cam 250, the rotation of which is regulated, is no longer located in the recess 278, the memory cam 270 which is constantly urged clockwise in the plan view rotates clockwise (in a direction indicated by an arrow H1), and as illustrated in FIGS. 10 and 20, the claw part 274 is located on the upper part of the claw part 260 of the unlocking cam 250. As a result, the unlocking cam 250 is constantly urged in the clockwise direction (the direction indicated by the arrow C2) by the urging force of the spring 264. However, since the claw part 260 is locked by the claw part 274 of the memory cam 270, the unlocking cam 250 cannot return to the original position. That is, the unlocked state of the upper slide 30 with respect to the upper slide rail 28 is maintained.

On the other hand, as illustrated in FIG. 21, the forward tilting of the seat back 16 applies a tensile force to the fourth wire 350, so that the end of the fourth wire 350 with which the first arm 290 of the unlocking link 280 engages moves rightward (in a direction indicated by an arrow J1) in the figure. As a result, the unlocking link 280 rotates in the clockwise direction (the direction indicated by the arrow D2) around the rotation shaft 288 and the pin 294 moves from the upper position (see FIG. 13) to the lower position (see FIG. 21) relatively below the seat.

Thus, by tilting the seat back 16, the locked state of the upper slide 30 with respect to the upper slide rail 28 is released (unlocked state is fixed) by the upper lock mechanism 34, and the pin 294 of the unlocking link 280 is located at the lower position.

In this state, when the seat back 16 is pushed forward, as illustrated in FIG. 22, the upper slide 30 integrally provided with the vehicle seat 12 moves to the tip end position of the upper slide rail 28.

In this case, as illustrated in FIG. 4, the flat plate part 284 of the support member 282 extends from the upper part of the flat plate 212 of the upper slide 30 to the inner side in the seat width direction of the memory release bracket 202, and the vertical wall part 286 is formed below the seat from the seat inner end of the flat plate part 284. In this case, since the unlocking link 280 is attached to the inside of the inner side in the seat width direction of the vertical wall part 286, the interference between the unlocking link 280 and the memory release bracket 202 is prevented when the upper slide 30 moves toward the seat front side.

As illustrated in FIG. 23, when the upper slide 30 reaches the vicinity of the tip end position of the upper slide rail 28, the guide surface 167 of the lock 160 is located in front of the seat of the pin 294 of the unlocking link 280 in the lower position.

Accordingly, as illustrated in FIG. 24, when the upper slide 30 reaches the tip end position, the inner part of the pin 294 pushes the guide surface 167 of the lock 160 to cause the lock 160 to be fit into the recess 168 while rotating the lock 160 in the clockwise direction (in a direction indicated by an arrow K1) around the rotation shaft 162. The outer part of the pin 294 pushes the contact surface 116 of the lower slide lever 110 downward and the lower slide lever 110 rotates in the counterclockwise direction (in a direction indicated by an arrow L1 in FIG. 24) around the rotation shaft 112 against the urging force of the coil spring 126. As a result, the lower slide lock 90 to which the pin member 122 is inserted into the elongated hole 120 of the second arm 118 of the lower slide lever 110 moves upward. As a result, the leg parts 96 of the lower slide lock 90 are detached from the holes 44 (see FIG. 3) of the lower slide rail 24. That is, the locked state of the lower slide 26 with respect to the lower slide rail 24 is released.

In addition, the pin 294 of the unlocking link 280 is accommodated in the recess 168 of the lock 160, so that the upper slide 30 and the lower slide 26 are locked (fixed). That is, the upper slide 30 and the lower slide 26 are made to move integrally.

Further, due to the rotation of the lock 160, the curved surface 164 of the lock disappears from above the contact surface 156 of the cam 150 (see FIG. 2). Accordingly, as illustrated in FIG. 25, the cam 150 urged clockwise rotates in the clockwise direction (see a direction indicated by an arrow N1 in FIG. 25) around the rotation shaft 152, and the contact surface 156 contacts the engaging surface 166 of the lock 160. The A-link 130 in which the second arm 140 is constantly in contact with the pin 154 of the cam 150 also rotates in the counterclockwise direction (in a direction indicated by an arrow P1 in FIG. 25) around the rotation shaft 134. However, since the clearance 58 is provided in the release bracket 50, the pin 138 of the A-link 130 does not interfere with the release bracket 50 (see FIG. 26).

In this manner, simply by moving the upper slide 30 to the tip end position of the upper slide rail 28, the upper slide 30 and the lower slide 26 are locked by the vertical slide lock mechanism 36, and the locked state of the lower slide 26 with respect to the lower slide rail 24 is released by the lower lock mechanism 32.

As illustrated in FIG. 27, since the lower slide 26 is constantly urged toward the seat front side by the spring 80, when the locked state with respect to the lower slide rail 24 is released, the lower slide 26 moves to the seat front side. In addition, since the upper slide 30 and the lower slide 26 are locked, the upper slide 30 and the lower slide 26 move integrally to the seat front side.

As a result, as illustrated in FIG. 17C, the vehicle seat 12 moves to the tip end position, and the walk-in operation is completed.

(During Walk-in Return Operation)

Finally, an operation for returning from a walk-in operation will be described.

The occupant causes the seat back 16 of the vehicle seat 12 (see FIG. 28A) to be tilted backward in a state where the walk-in operation is completed, and causes the seat cushion 14 to be returned to a normal position (see FIG. 28B).

As a result, as illustrated in FIG. 29, the recliner 322 of the recliner operation mechanism 320 rotates in the clockwise direction (in a direction indicated by an arrow E2 in FIG. 29). When the transmission member 324 rotates in the same direction, the pin 338 is spaced apart from the contact part 344 of the cable operation member 326. As a result, the cable operation member 326 rotates in the counterclockwise direction (in a direction indicated by an arrow G2) around the rotation shaft 342 and returns to an initial position.

As a result, as illustrated in FIG. 29, the tensile force acting on the second wire 348 whose end is fixed to the cable operation member 326 disappears, and the second wire 348 moves to the seat lower side. Along with the movement, the third wire 312 connected to the second wire 348 by the merging part 310 also moves rightward (in the direction indicated by the arrow B2) in the vicinity of the unlocking cam 250, and the spherical body 261 is spaced apart from the engaging part 263 of the unlocking cam 250. As a result, the engagement state of the unlocking cam 250 by the spherical body 261 is released, but since the claw part 260 engages with the claw part 274 of the memory cam 270, the unlocking cam 250 cannot rotate in the clockwise direction (in the direction indicated by the arrow C2) in the figure (see FIG. 10). That is, the unlocked state of the upper slide 30 with respect to the upper slide rail 28 is maintained.

Similarly, the tensile force acting on the fourth wire 350 disappears, and the fourth wire 350 moves to the seat lower side. As a result, as illustrated in FIG. 29, a rotational moment in the clockwise direction (in the direction indicated by the arrow D1 in FIG. 21) acts on the unlocking link 280 to which the end of the fourth wire 350 is fixed. However, the pin 294 is fit into the recess 168 of the lock 160, thereby preventing the unlocking link 280 from rotating.

Further, by pushing the vehicle seat 12 toward the seat rear side, the lower slide 26 is moved to the overrun position at the seat rear side relative to the rear end position on the lower slide rail 24. Since the vertical slide lock mechanism 36 is locked (the upper slide 30 and the lower slide 26 are integrated), the upper slide 30 moves integrally with the lower slide 26.

In this case, as illustrated in FIG. 30, the lower slide 26 passes through the rear end position of the lower slide rail 24, so that the holes 44 and 44 (see FIG. 3) of the lower slide rail 24 are located below the leg parts 96 and 96 of the lower slide lock 90. However, when the contact surface 156 of the cam 150 contacts the engaging surface 166, the curved surface 158 of the cam 150 contacts the stepped surface 174. As a result, the lock 160 urged counterclockwise in the figure is locked by the cam 150. The unlocking link 280 in which the pin 294 is fit into the recess 168 of the lock 160 is also locked. Therefore, since the contact surface 116 of the lower slide lever 110 is in contact with the pin 294 of the unlocking link 280, the lower slide lever 110 cannot rotate clockwise in the figure. As a result, the leg parts 96 and 96 of the lower slide lock 90 are not inserted into the holes 44 and 44 of the lower slide rail 24. That is, the unlocked state of the lower slide 26 with respect to the lower slide rail 24 is maintained.

Further, as illustrated in FIGS. 31 and 32, by pushing the lower slide 26 to the overrun position at the seat rear side relative to the rear end position on the lower slide rail 24 against the urging force of the spring 80, thereby bringing the pin 138 of the A-link 130 into contact with the upper plate part 52 of the release bracket 50. As a result, a reaction force is input from the release bracket 50 to the A-link 130. As a result, the A-link 130 rotates in the clockwise direction (in a direction indicated by an arrow P2 in FIG. 32) around the rotation shaft 134. As a result, the pin 154 of the cam 150 with which the contact surface 142 of the second arm 140 is in contact is pushed downward. As a result, the cam 150 which is constantly urged in the clockwise direction is rotated in the counterclockwise direction (in a direction indicated by an arrow N2 in FIG. 32), and the contact surface 156 and the curved surface 158 of the cam 150 are spaced apart from the engaging surface 166 of the lock 160 and the stepped surface.

The rotation of the cam 150 enables the lock 160 to rotate, and as illustrated in FIGS. 33 and 34, and the lock 160 rotates in the counterclockwise direction (in a direction indicated by an arrow K2 in FIG. 34) until the protrusion 172 contacts the curved surface 158 of the cam 150.

Due to the rotation of the lock 160, the pin 294 of the unlocking link 280 is detached from the recess 168 of the lock 160, and the unlocking link 280 rotates in the counterclockwise direction (in a direction indicated by an arrow D2 in FIG. 34) by the urging force of the fourth wire 350. As a result, the outer part of the pin 294 of the unlocking link 280 is spaced apart from the contact surface 116 of the lower slide lever 110. Therefore, the lower slide lever 110 urged clockwise in the figure by the coil spring 126 is rotatable. However, the holes 44 and 44 of the lower slide rail 24 are not present below the lower slide lock 90, and thus the lower slide lever 110 does not rotate.

On the other hand, when the pin 294 of the unlocking link 280 is detached from the recess 168 of the lock 160, the lock of the vertical slide lock mechanism 36 is released. That is, the fixation between the upper slide 30 and the lower slide 26 is released.

Thus, the occupant pushes the vehicle seat 12 to the seat rear side, thereby allowing the upper slide 30 to slide from the tip end position toward the rear end position with respect to the upper slide rail 28.

In this case, as illustrated in FIGS. 35 and 36, the lower slide 26 which has moved to the overrun position moves to the seat front side by the urging force of the spring 80 on the lower slide rail 24, and then returns to the rear end position. Thus, the lower slide lever 110 rotates in the clockwise direction (in a direction indicated by an arrow L2 in FIG. 36) around the rotation shaft 112, and the lower slide lock 90 descends, so that the leg parts 96 and 96 are respectively inserted into the holes 44 and 44 of the lower slide rail 24. In this manner, the lower lock mechanism 32 locks the lower slide 26 at the rear end position with respect to the lower slide rail 24.

On the other hand, when the upper slide 30 reaches the rear end position on the upper slide rail 28, as illustrated in FIG. 37, the inner side in the seat width direction of the memory cam 270 is located on the side of the memory release bracket 202. That is, as illustrated in FIG. 20, when the upper slide 30 reaches the vicinity of the rear end position of the upper slide rail 28, the claw part 276 protruding inward in the seat width direction of the upper slide rail 28 comes into contact with the guide plate 204 of the memory release bracket 202 which is tilted outward from the inside in the seat width direction. Therefore, when the upper slide 30 reaches the rear end position of the upper slide rail 28, the memory cam 270 with the claw part 276 being guided by the guide plate 204 rotates counterclockwise (in a direction indicated by an arrow H2 in FIG. 20) in plan view, and the recess 278 is located on the hole 262 (see FIG. 11). As a result, the claw part 274 of the memory cam 270 located above the claw part 260 of the unlocking cam 250 disappears, and the recess 278 is located. As a result, the unlocking cam 250 urged in the clockwise direction (in the direction indicated by the arrow C2 in FIG. 10) by the spring 264 rotates in the clockwise direction (in the direction indicated by the arrow C2) until the contact part 268 contacts the plate 240. Thus, as illustrated in FIG. 7, the deformable part 234 of the slider 210, which has been pushed down by the claw part 260 of the unlocking cam 250, ascends and the engaging part 200 of the upper slide rail 28 is inserted into the hole 238 of the lock plate 236.

As a result, the upper lock mechanism 34 is locked. That is, the upper slide 30 is locked to the upper slide rail 28 at the rear end position of the upper slide rail 28. As a result, the walk-in return operation is completed (see FIG. 28C).

(Operation and Effect)

The seat slide mechanism 10 includes the lower slide rail 24 and the upper slide rail 28 and has two-stage slide rail structure in which the lower slide 26 and the upper slide 30 slide on the lower slide rail 24 and the upper slide rail 28, respectively. Accordingly, the length of the slide rail (corresponding to the lower slide rail 24 according to the embodiment) disposed on the floor panel of the vehicle can be suppressed, and the slide rail extends more toward the front side than toward the lower side of the vehicle seat 12, thereby preventing a deterioration in the occupant's habitability. That is, an excellent occupant's habitability can be ensured.

On the other hand, the lower slide 26 moves from the rear end position of the lower slide rail 24 to the tip end position thereof, and the upper slide 30 moves from the rear end position on the upper slide rail 28 provided on the lower slide 26 to the tip end position thereof. Accordingly, a sufficient amount of movement of the vehicle seat 12 can be secured during the walk-in operation and the walk-in return operation, and excellent getting-on/off properties of the occupant seated in the rear-row seat can be obtained.

In addition, during the walk-in operation, the seat cushion 14 is raised and the seat back 16 is tilted forward by operating the lever 20 of the seat back 16. In this state, simply by pushing the seat back 16 toward the seat front side, the upper slide 30 moves on the upper slide rail 28 from the rear end position to the tip end position, and subsequently the lower slide 26 moves on the lower slide rail 24 from the rear end position to tip end position. That is, the operation is completed by one action of pushing the vehicle seat toward the seat front side, and thus excellent operability can be obtained.

Furthermore, also during the walk-in return operation, by simply returning the seat back 16 and the seat cushion 14 to their original positions and pushing the vehicle seat 12 (seat back 16) toward the seat rear side, the lower slide 26 moves on the lower slide rail 24 from the tip end position to the rear end position, and then the upper slide 30 moves on the upper slide rail 28 from the tip end position to the rear end position. That is, the operation is completed by one action of pushing the vehicle seat toward seat rear side, and thus excellent operability can be obtained.

Also, during the walk-in operation, simply by causing the upper slide 30 to reach the tip end position of the upper slide rail 28, the pin 294 of the unlocking link 280 is fit into the recess 168 of the lock 160, and the pin 294 rotates the lower slide lever 110. That is, the movement of the pin 294 provided at the upper slide 30 allows the vertical slide lock mechanism 36 to be locked and allows the lower lock mechanism 32 to be unlocked. Accordingly, during the walk-in operation, when the upper slide 30 is moved to the tip end position of the upper slide rail 28, the lower slide 26 integrally provided with the upper slide 30 can slide on the lower slide rail 24. That is, the upper slide 30 and the lower slide 26 of the seat slide mechanism 10 can sequentially slide simply by pushing the vehicle seat 12 toward the seat front side.

During the walk-in return operation, when the lower slide 26 reaches the overrun position of the lower slide rail 24, the pin 294 of the unlocking link 280 comes out of the recess 168 of the lock 160 and the lock of the vertical slide lock mechanism 36 is released.

Subsequently, when the lower slide 26 returns to the rear end position of the lower slide rail 24, the lower slide lever 110 rotates and the lower slide lock 90 is inserted into the holes 44 of the lower slide rail 24, thereby locking the lower lock mechanism 32.

That is, if the unlocking of the vertical slide lock mechanism 36 is performed at the rear end position of the lower slide rail 24, the rotation of the lock 160 is hindered, which may make it difficult to smoothly remove for the pin 294 from the recess 168 of the lock 160. Therefore, after the lower slide 26 is first moved to the overrun position of the lower slide rail 24 to release the lock of the vertical slide lock mechanism 36, the lower slide 26 is returned to the rear end position of the lower slide rail 24 to lock the lower lock mechanism 32, thereby reliably performing unlocking and locking.

Furthermore, the lower lock mechanism 32 and the vertical slide lock mechanism 36 are commonly used for the release bracket 50, the A-link 130, the cam 150, the lock 160, the unlocking link 280, the fourth wire 350, and the recliner operation mechanism 320, which are used for unlocking. That is, the number of parts of the seat slide mechanism 10 can be reduced.

In the seat slide mechanism 10, the lower lock mechanism 32 and the upper lock mechanism 34 are unlocked at the end of the walk-in operation, that is, in a state where the lower slide 26 is located at the tip end position of the lower slide rail 24 and the upper slide 30 is located at the tip end position of the upper slide rail 28. Therefore, at the start of the walk-in return operation, it is only necessary to tilt the seat back 16 backward and push the vehicle seat 12 toward the seat rear side. In other words, there is no need to unlock the lower lock mechanism 32 and the upper lock mechanism 34, and excellent operability can be obtained.

(Other)

In the embodiment, during the walk-in return operation, the operation for returning from the forward tilting of the seat back 16 and flipping-up of the seat cushion 14 is first performed, and then the operation for allowing the vehicle seat 12 to slide toward the seat rear side is performed. However, these operations may be performed at the same time.

Further, in the embodiment, the unlocking of the vertical slide lock mechanism 36 is performed at the overrun position during the walk-in return operation. However, the unlocking may be performed together with the locking of the lower lock mechanism 32 at the rear end position.

Assume that the rear end position of the lower slide rail in the disclosure also includes the overrun position according to the embodiment.

Furthermore, in the embodiment, the deformable part 234 of the slider 210 and the lock plate 236 of the upper lock mechanism 34 are configured to lock or unlock the engaging part 200 by elastic deformation. However, the invention is not limited to this configuration. For example, the lock plate 236 may be configured to be vertically movable (vertically displaced) so that the engaging part 200 is locked or unlocked.

What is claimed is:

1. A seat slide mechanism comprising:
   a lower slide rail fixed onto a vehicle floor;
   a lower slide disposed in a seat front-back direction so as to be slidable on the lower slide rail;
   an upper slide rail provided on the lower slide;
   an upper slide integrally provided with a vehicle seat and disposed in the seat front-back direction so as to be slidable on the upper slide rail;
   an upper lock mechanism configured to fix the upper slide and the upper slide rail and release the fixation, forward tilting of a seat back of the vehicle seat allowing the fixation between the upper slide and the upper slide rail to be released, and backward tilting of the seat back and movement of the upper slide to a rear end position of the upper slide rail allowing the upper slide and the upper slide rail to be fixed;
   a lower lock mechanism configured to fix the lower slide and the lower slide rail and release the fixation, forward tilting of the seat back and movement of the upper slide to a tip end position of the upper slide rail allowing the fixation between the lower slide and the lower slide rail to be released, and backward tilting of the seat back and movement of the lower slide to a rear end position of the lower slide rail allowing the lower slide to be fixed to the lower slide rail; and
   a vertical slide lock mechanism configured to fix the upper slide and the lower slide and release the fixation, forward tilting of the seat back and movement of the upper slide to the tip end position of the upper slide rail allowing the upper slide and the lower slide to be fixed, and backward tilting of the seat back and movement of the lower slide to the rear end position of the lower slide rail allowing the fixation between the upper slide and the lower slide to be released.

2. The seat slide mechanism according to claim 1, wherein the vertical slide lock mechanism includes:
   a pin provided at the upper slide;
   an engaging member provided at the lower slide and including a recess for accommodating and engaging with the pin in a case in which the upper slide reaches the tip end position of the upper slide rail; and an engagement releasing mechanism configured to release an engagement state between the engaging member and the pin in a case in which the lower slide is moved to the rear end position of the lower slide rail.

3. The seat slide mechanism according to claim 2, wherein forward tilting of the seat back allows the pin to move to a lower position, and backward tilting of the seat back allows the pin to move to an upper position, the pin located at the lower position being accommodated in the recess of the engaging member.

4. The seat slide mechanism according to claim 1, wherein the upper lock mechanism includes:
a first engaged part provided at the upper slide rail;
a first engaging part provided at the upper slide and configured to be deformed or displaced to engage with the first engaged part or release the engagement; and
an urging unit provided at the upper slide and configured to urge the first engaging part to be deformed or displaced in a direction away from the first engaged part in a case in which the seat back is tilted forward, and to urge the first engaging part to be deformed or displaced in a direction approaching the first engaged part in a case in which the seat back is tilted backward.

5. The seat slide mechanism according to claim 4, wherein the upper lock mechanism includes an engagement release state maintaining unit configured to maintain an engagement release state in a case in which forward tilting of the seat back allows the first engaging part to release the engagement of the first engaged part.

6. The seat slide mechanism according to claim 1, wherein the lower lock mechanism includes:
a second engaged part provided at the lower slide rail;
a second engaging part provided at the lower slide and configured to be displaced or deformed to engage with the second engaged part; and
a driving unit configured to cause the second engaging part to be displaced or deformed toward the second engaged part to engage with the second engaged part in a case in which the lower slide reaches the rear end position of the lower slide rail.

7. The seat slide mechanism according to claim 1, wherein the upper slide includes an operation lever configured to be operated to release fixation of the upper lock mechanism.

* * * * *